United States Patent
Fay, II

(10) Patent No.: US 10,631,452 B2
(45) Date of Patent: Apr. 28, 2020

(54) LATERAL TRANSPORT SYSTEM FOR HARVESTER

(71) Applicant: CNH Industrial America, LLC, New Holland, PA (US)

(72) Inventor: Jeffrey B. Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 180 days.

(21) Appl. No.: 15/859,831

(22) Filed: Jan. 2, 2018

(65) Prior Publication Data
US 2019/0200511 A1 Jul. 4, 2019

(51) Int. Cl.
| | |
|---|---|
| A01B 73/04 | (2006.01) |
| A01D 43/06 | (2006.01) |
| A01D 57/28 | (2006.01) |
| A01D 34/64 | (2006.01) |
| A01B 63/22 | (2006.01) |

(Continued)

(52) U.S. Cl.
CPC ............ *A01B 73/048* (2013.01); *A01B 63/22* (2013.01); *A01B 73/005* (2013.01); *A01B 73/04* (2013.01); *A01B 73/042* (2013.01); *A01D 34/64* (2013.01); *A01D 43/06* (2013.01); *A01D 57/28* (2013.01); *A01D 2101/00* (2013.01)

(58) Field of Classification Search
CPC ..... A01B 73/048; A01B 63/22; A01B 73/005; A01B 73/042; A01B 73/04; A01B 69/003; A01B 63/002; A01B 73/00; A01D 57/28; A01D 43/06; A01D 34/64; A01D 2101/00; A01D 67/005; A01D 67/00; A01D 75/002
See application file for complete search history.

(56) References Cited

U.S. PATENT DOCUMENTS 3,918,240 A 11/1975 Haffner
4,435,948 A 3/1984 Jennings
(Continued)

FOREIGN PATENT DOCUMENTS

| EP | 1179293 A1 | 9/2011 |
|---|---|---|
| EP | 2656714 A1 | 10/2013 |
| EP | 2965613 A1 | 1/2016 |

OTHER PUBLICATIONS

Extended European Search Report for EP Application No. 18.215.294.2 dated Feb. 15, 2019 (eight pages).

*Primary Examiner* — Arpad Fabian-Kovacs
(74) *Attorney, Agent, or Firm* — Peter K. Zacharias; Patrick M. Sheldrake

(57) ABSTRACT

A lateral transport system for a harvester including a chassis, first and second ground wheels coupled to the chassis, and a lateral transport assembly operably coupled to the chassis and operable between a transport operation mode and a stowed operation mode. A tongue is pivotally coupled to the chassis, a first suspension element is rotatable about a first axis and a second axis, a second suspension element is rotatable about the second axis, and a hydraulic actuation system is operably coupled to the tongue, the first suspension element, and the second suspension element. In the transport operation mode, hydraulic fluid is allowed to flow into the hydraulic actuation system to rotate the first suspension element about the first axis, and subsequently rotate the first and second suspension elements about the second axis.

18 Claims, 33 Drawing Sheets

(51) Int. Cl.
*A01B 73/00* (2006.01)
*A01D 101/00* (2006.01)

(56) References Cited

U.S. PATENT DOCUMENTS

| | | | | |
|---|---|---|---|---|
| 4,552,375 A * | 11/1985 | Kinzenbaw | ......... | A01B 73/005 172/248 |
| 4,558,560 A * | 12/1985 | Koch | ............... | A01B 73/005 56/192 |
| 4,682,462 A | 7/1987 | Johnson, Sr. | | |
| 4,871,028 A * | 10/1989 | Murray | ............... | A01B 73/005 172/248 |
| 4,991,383 A * | 2/1991 | Ermarcora | ........... | A01D 67/00 56/14.5 |
| 5,136,828 A * | 8/1992 | Ermacora | ........... | A01B 63/00 280/43.23 |
| 6,189,306 B1 * | 2/2001 | Walch | ................. | A01D 67/005 56/15.1 |
| 6,260,629 B1 * | 7/2001 | Toth | ................... | A01B 73/005 172/278 |
| 6,273,449 B1 * | 8/2001 | Harkcom | ............ | A01B 73/005 280/463 |
| 6,907,719 B2 * | 6/2005 | Ligouy | ................ | A01B 73/005 56/15.1 |
| 7,926,249 B1 * | 4/2011 | Cook | .................. | A01B 73/005 172/240 |
| 8,292,328 B2 * | 10/2012 | Honas | .................. | A01D 75/002 280/769 |
| 8,646,543 B2 | 2/2014 | Yuen | | |
| 9,526,204 B2 * | 12/2016 | Rude | ..................... | A01D 34/00 |
| 9,565,800 B2 * | 2/2017 | Fay, II | ................... | A01D 43/06 |
| 9,596,808 B2 * | 3/2017 | Fay, II | ................... | A01D 75/004 |
| 2011/0219738 A1 | 9/2011 | Thompson | | |
| 2013/0283746 A1 * | 10/2013 | Chan | ..................... | A01B 63/22 56/10.7 |
| 2015/0282421 A1 | 10/2015 | Barnett | | |
| 2016/0007534 A1 * | 1/2016 | Fay, II | ................. | A01B 73/005 56/228 |
| 2016/0066509 A1 | 3/2016 | Fay, II et al. | | |

* cited by examiner

LATERAL TRANSPORT SYSTEM FOR HARVESTER

BACKGROUND

Harvesters such as windrowers, tractors, forage harvesters, and mowers (e.g., self-propelled and pull-behind) generally include a header operable to cut crops. Typical construction for such harvesters include a cab mounted to a frame, front ground wheels mounted on the frame, rear ground wheels mounted on a respective caster, and a header mounted to the frame.

Pull-behind center pivot mowers generally include a reconfigurable transport arrangement for supporting a pull-behind mower header to be laterally transported while attached to a tractor. Such transport arrangements are generally mounted to a chassis and capable of laterally deployed to lift the chassis during transport (see, e.g., U.S. Pat. No. 9,596,808). Pull-behind mower headers include a tongue capable of being rotated from an operation position substantially perpendicular to the chassis to a transport position substantially aligned or parallel with the chassis. However, such pull-behind mower headers do not include functional lockouts for the lateral transport hydraulics.

SUMMARY

The disclosure further relates to a lateral transport hydraulic system for harvesters, such as pull-behind mowers, center pivot mowers, or the like, that provides functional lockouts for the lateral transport hydraulic based on mower positioning, lift and pivot location.

In accordance with some embodiments of the present disclosure, an exemplary lateral transport system for a harvester is provided. The lateral transport system comprises a chassis, first and second ground wheels rotatably coupled to the chassis, and a lateral transport assembly operably coupled to the chassis and operable between a transport operation mode and a stowed operation mode. The lateral transport assembly comprises a tongue pivotally coupled to the chassis, a first suspension element rotatable about a first axis and a second axis, a second suspension element rotatably about the second axis, and a hydraulic actuation system operably coupled to the tongue, the first suspension element, and the second suspension element. In the transport operation mode, hydraulic fluid is allowed to flow into the hydraulic actuation system to rotate the first suspension element about the first axis, and subsequently rotate the first and second suspension elements about the second axis.

The first axis is perpendicular to the second axis. In certain embodiments, the hydraulic actuation system comprises a single tongue hydraulic cylinder coupled between the tongue and the chassis. In a transport operation mode, the tongue hydraulic cylinder is actuated to rotate the tongue from a first position to a second position substantially lateral relative to the chassis.

In certain embodiments, the hydraulic actuation system comprises a first tongue hydraulic cylinder and a second tongue hydraulic cylinder. The first tongue hydraulic cylinder is pivotally coupled between a first flange of the tongue and a first flange of the chassis. The second tongue hydraulic cylinder is pivotally coupled between the first flange of the tongue and a second flange of the tongue. In the transport operation mode, the first tongue hydraulic cylinder is actuated to extend to partially rotate the tongue relative to the chassis prior to rotation of the first suspension element about the first axis. After rotation of the first suspension element about the first axis, the second tongue hydraulic cylinder is actuated to extend to rotate the tongue relative to the chassis to a laterally extending position.

The hydraulic actuation system comprises a functional lockout of the lateral transport system after rotation of the first and second suspension elements about the second axis. In the stowed operation mode, the hydraulic fluid is allowed to flow into the hydraulic actuation system to rotate the first and second suspension elements about the second axis, and subsequently rotate the first suspension element about the first axis to position the first suspension element over the second suspension element.

In accordance with some embodiments of the present disclosure, an exemplary a harvester (e.g., a center pivot mower, or the like) is provided. The harvester comprises a frame, first and second lift cylinders operably coupled to the frame and configured to selectively lift and lower a header. The harvester comprises a chassis, first and second ground wheels rotatably coupled to the chassis, and a lateral transport assembly operably coupled to the chassis and operable between a transport operation mode and a stowed operation mode. The lateral transport assembly comprises a tongue pivotally coupled to the chassis, a first suspension element rotatable about a first axis and a second axis, a second suspension element rotatably about the second axis, and a hydraulic actuation system operably coupled to the tongue, the first suspension element, and the second suspension element. In the transport operation mode, hydraulic fluid is allowed to flow into the hydraulic actuation system to rotate the first suspension element about the first axis, and subsequently rotate the first and second suspension elements about the second axis.

In accordance with embodiments of the present disclosure, an exemplary harvester is provided. The harvester comprises a frame, first and second lift cylinders operably coupled to the frame and configured to selectively lift and lower a lateral transport system relative to the frame, and the lateral transport system. The lateral transport system comprises a chassis, first and second ground wheels rotatably coupled to the chassis, a lateral transport assembly operably coupled to the chassis and operable between a transport operation mode and a stowed operation mode. The lateral transport assembly comprises a tongue pivotally coupled to the chassis, a first suspension element rotatable about a first axis and a second axis, a second suspension element rotatably about the second axis, and a hydraulic actuation system operably coupled to the tongue, the first suspension element, and the second suspension element. In the transport operation mode, hydraulic fluid is allowed to flow into the hydraulic actuation system to rotate the first suspension element about the first axis, and subsequently rotate the first and second suspension elements about the second axis.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed lateral transport systems, reference is made to the accompanying figures, wherein.

DETAILED DESCRIPTION

Figure 1:
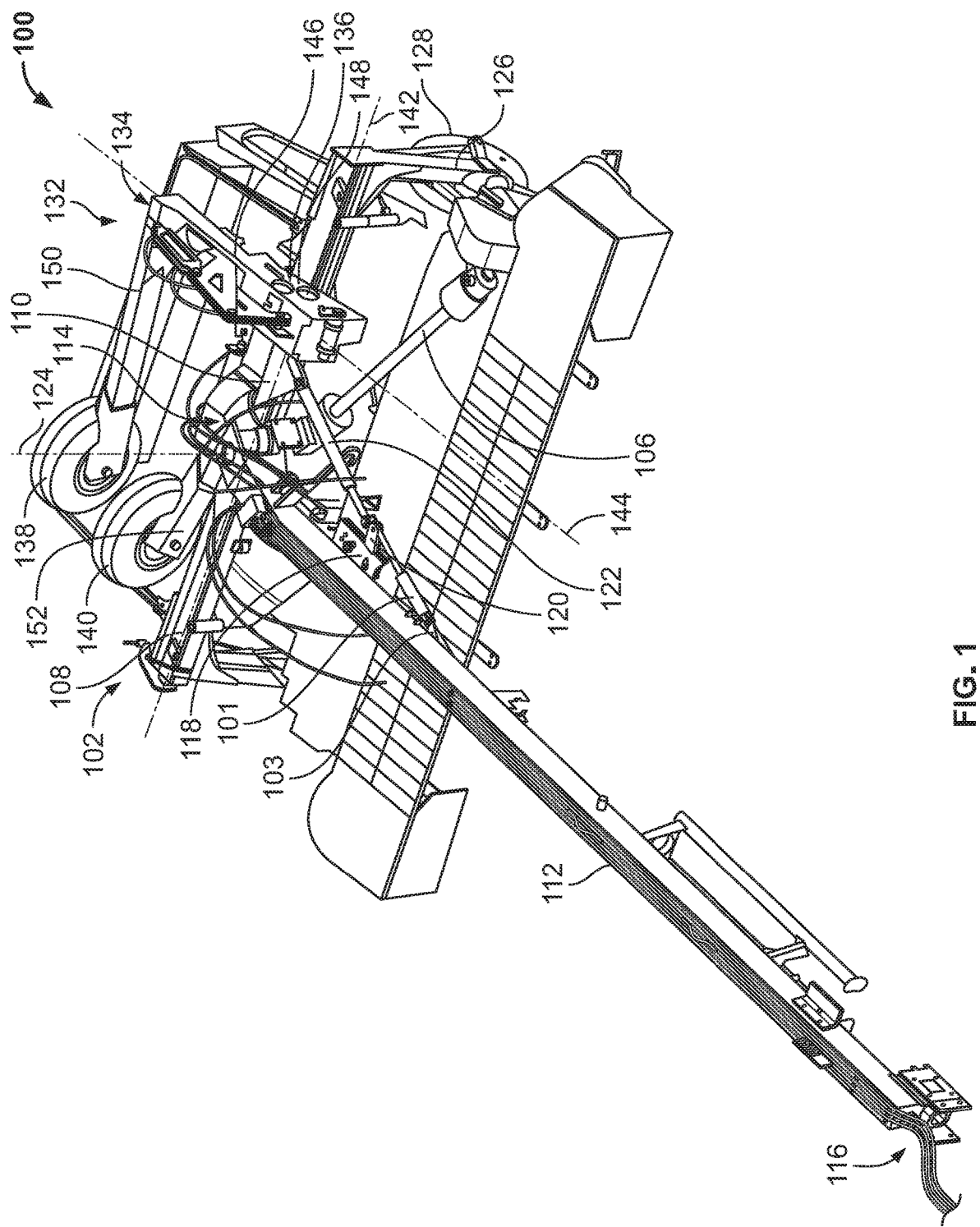
FIG. 1 is a perspective view of an exemplary lateral transport system of the present disclosure in a stowed configuration.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" or "approximately" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, lawn mower or a combine including a baling mechanism. In some embodiments, the harvester is a self-propelled windrower. In some embodiments, the harvester is a center pivot mower.

The term "material" as used herein is defined as a numerous individual items that are harvested or collected by the harvester. In some embodiments, the material is agricultural crop, such as hay or silage. In some embodiments, the material is biomass.

The term "drive system" as used herein is defined as an assembly, hydraulic or mechanical arrangement that allows for control of the front and/or rear wheels of the harvester.

The term "information" as used herein is defined as data values attributed to parameters. In some embodiments, information is digital and/or analog information. In some embodiments, information is the current operable mode of the harvester. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which comprises but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may comprise any apparatus that can contain, store, communicate, propagate, or transport the program for use by or in connection with the instruction execution system, or harvester. In some embodiments, the harvester comprises a software system with executable code that executes different hydraulic states based on operator settings. In some embodiments, the disclosure also relates to a computer software product with executable code that automatically toggles between or through different hydraulic states based on operator settings of the harvester. The software program product may be on any medium or a component of a system optionally configured for update or install into the software of an existing harvester.

In some embodiments, the medium may be or may comprise an electronic, magnetic, optical, electromagnetic, InfraRed (IR), or semiconductor system (or apparatus or device) or a propagation medium. Some demonstrative examples of a computer-readable medium may comprise a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks comprise Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may comprise at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about setting the wheel height of the harvester.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the settings of the harvester.

The term "real-time" and the phrase "in real-time" as used herein are defined as a way of describing a process, event, or action that occurs simultaneously with the process of actively operating a harvester. In some embodiments, various sensors continuously sense information about the harvester and transmit that information to a controller in real-time. In some embodiments, an operator may adjust values or thresholds for one or more hydraulic states in real-time through the operator interface by accessing the system electronically and inputting one or a plurality of values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Mowers, such as self-propelled or pull-behind mowers, are well known in the agricultural industry, and the instant invention can be used with substantially any of such machines. Reference is made, for example, to U.S. Pat. Nos. 9,565,800 and 9,596,808, that illustrate such mowers, the disclosures of which are incorporated herein by reference in their entireties. The present invention may also find utility in agricultural harvesters including, for example, a self-propelled windrower, a forage harvester, and a lawn mower.

In some embodiments, the method is performed by a harvester comprising a crop supply chamber, a crop gating system, and one or more sensors. In some embodiments, the one or more sensors are capable of determining a range of information. In some embodiments, the one or more sensors are in electronic communication with one or more controllers. In some embodiments, the one or more sensors can be a wheel position sensor, or the like. In some embodiments, additional sensors can be used to assist in field function of the windrower by sensing, e.g., speed of discs/conditioner rolls on disc heads, speed of reels, sickles, and draper belts on draper units, and merger belt speed and/or merger position (if a crop merger is in use), lift arm height, header tilt, ground clearance, combinations thereof, or the like.

FIGS. 1-9 are perspective, front and side views of an exemplary mower lateral transport system 100 (hereinafter "system 100") in stowed, partially deployed, and deployed configurations. The system 100 can be used with any type of pull-type mower. For example, the system 100 can be used with the agricultural mowers disclosed in U.S. Pat. Nos. 9,565,800 and 9,596,808, the disclosures of which are incorporated herein by reference in their entireties. The structural elements of the system 100 are discussed with respect to FIGS. 1-9, and the hydraulic control elements for the system 100 are discussed in subsequent hydraulic circuit diagrams.

With reference to FIG. 1, the system 100 comprises a chassis 102 that supports one or more components of a header for harvesting crop. In certain embodiments, the system 100 can be used in combination with any type of header for a pull-type mower. The chassis 102 comprises cutting elements 104 (e.g., blades) and a drive component 106 for operating the cutting elements 104. The chassis 102 comprises a distal end frame 108 extending between the sides of the chassis 102, with a flange 110 extending in a proximal direction from the frame 108.

The system 100 comprises a tongue 112 pivotally coupled to the chassis 102. The tongue 112 comprises a distal end 114 pivotally coupled to the chassis 102 and a proximal end 116 at the opposing end. The proximal end 116 is configured to be coupled to a cab for pulling the system 100 during transport or during a mowing operation (see, e.g., cab or harvester 109 and frame 111 of FIG. 2). Between the distal and proximal ends 114, 116, the tongue 112 comprises a lateral flange 118 fixedly coupled to the tongue 112. The system 100 comprises a secondary double-sided flange 118 with a gap therebetween for pivotally receiving the flange 120.

A first hydraulic cylinder 122 (e.g., a swing cylinder) is pivotally coupled at one end to flange 120 and pivotally coupled at the opposing end to the flange 110 of the frame 108. The system 100 includes a second hydraulic cylinder 101. Thus, one end of the flange 120 is pivotally coupled to the flange 118, while the opposing end comprises two openings for coupling with the first swing hydraulic cylinder 122 and the second swing hydraulic cylinder 101. As an example, the rod end of the hydraulic cylinder 122 is pivotally coupled to the flange 120 and the barrel end of the hydraulic cylinder 122 is pivotally coupled to the flange 110. The rod end of the hydraulic cylinder 101 is pivotally coupled to the flange 120 and the barrel end of the hydraulic cylinder 101 is pivotally coupled to a flange 103 extending from the tongue 112 closer to the proximal end 116 than the flange 118. Although illustrated with the rod end of the hydraulic cylinder 122 coupled to the flange 120 and the barrel end coupled to the flange 110, it should be understood that the hydraulic cylinder 122 can be coupled in the opposing direction. Similarly, the orientation of the second hydraulic cylinder 101 can be rotated.

As will be discussed in greater detail below, the hydraulic cylinders 122, 101 can be actuated to rotate or pivot the tongue 112 relative to the chassis 102 about axis 124. For example, the tongue 112 can be rotated about axis 124 during the mowing operation mode at positions that are perpendicular or angles relative to the chassis 102, and can be rotated about axis 124 to a position substantially parallel or aligned with the chassis 102 and extending laterally from the chassis 102 during the transport operation mode (see, e.g., FIGS. 6-9). It should be understood that the first hydraulic cylinder 122 is only capable of partially swinging the tongue 112 into the full lateral transport position, and the second hydraulic cylinder 101 acts to swing the tongue 112 into the full lateral transport position.

The system 100 comprises a field suspension system 126 that supports the system 100 when in the mower or field operation mode. In certain embodiments, the field suspension system 126 can comprise one of the hydraulic circuits discussed above for lifting or lowering the wheels 128, 130. The system 100 comprises a lateral transport assembly 132 that is configured to be positioned in a stowed configuration (see, e.g., FIG. 1) during the mowing or field operation mode, and a deployed configuration (see, e.g., FIG. 8) during the transport operation mode.

The lateral transport assembly 132 comprises suspension elements 134, 136 (e.g., substantially L-shaped suspension elements) that have wheels 138, 140 rotatably coupled to the respective ends of the suspension elements 134, 136. Each suspension element 132, 136 comprises a lateral member 146, 148 pivotally coupled to each other at one end, and side members 150, 152 fixedly coupled to the lateral members 146, 148 at one end and having the wheels 138, 140 coupled at the opposing end. The lateral member 146 of the suspension element 132 can be dimensioned longer than the lateral member 148 of the suspension element 136, such that in the stowed position shown in FIG. 1, the side member 150 and wheel 138 are laterally offset from the side member 152 and wheel 140.

Figure 4:
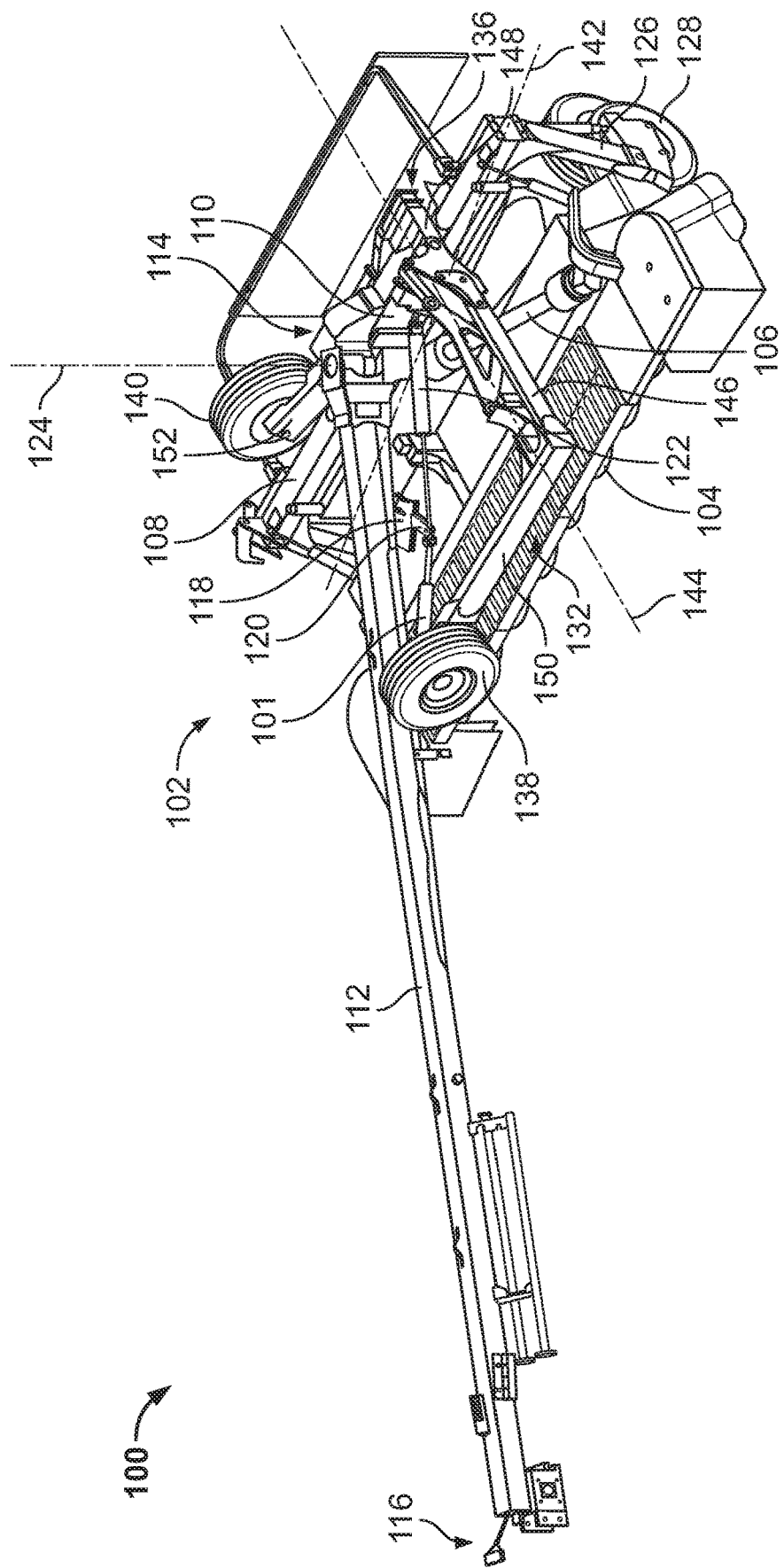
FIG. 4 is a perspective view of an exemplary lateral transport system of FIG. 1 in a flip cylinder deployed configuration.

The suspension element 134 is configured to rotate about axis 142 from a stowed position above the suspension element 136 and on one end of the chassis 102, to a partially deployed position substantially aligned along the same plane as the suspension element 136 and on the opposing end of the chassis 102 (see, e.g., FIG. 4). After positioned in the partially deployed position of FIG. 4, the lateral transport assembly 132 is configured to rotate about axis 144 to position the suspension elements 134, 136 on opposing sides of the chassis 102 with the wheels 138, 140 in contact with the ground (e.g., the deployed position shown in FIG. 5). The axes 142, 144 are substantially perpendicular to each other.

Figure 2:
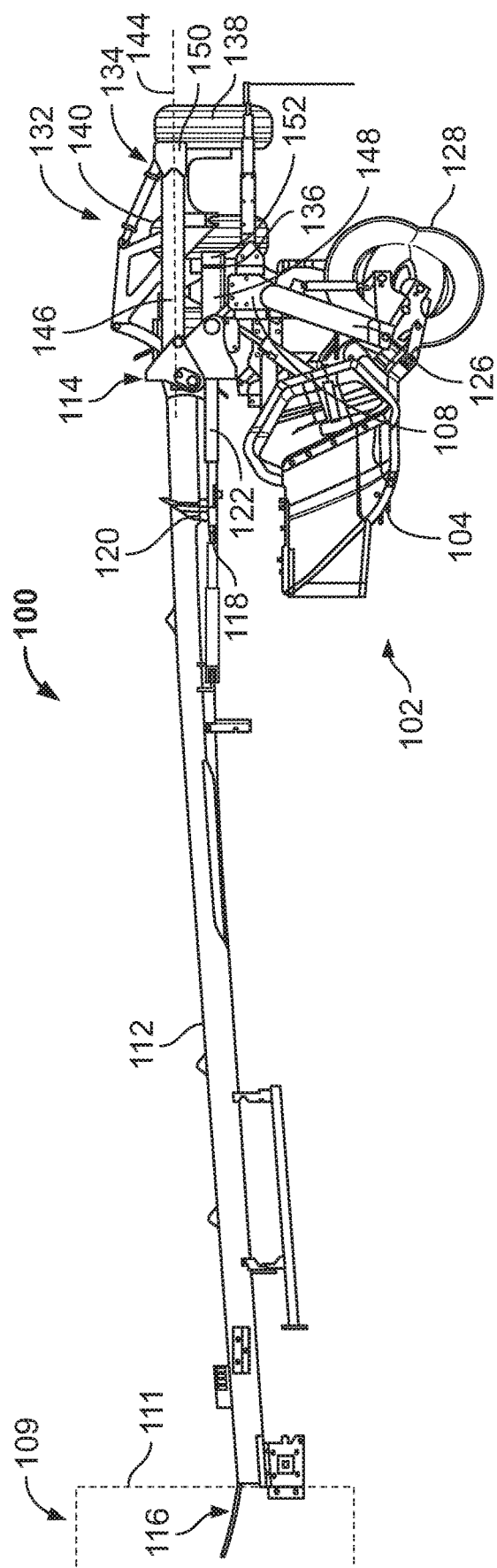
FIG. 2 is a left side view of an exemplary lateral transport system of FIG. 1 in a stowed configuration.

A sequence of movements of the components of the system 100 is performed via a hydraulic actuation system to position the system 100 into a stowed position or a transport position. FIGS. 1 and 2 show the lateral transport assembly 132 in a stowed position and the tongue 112 is positioned substantially perpendicular to the chassis 102 in a forward-facing direction. In this configuration, the system 100 can be used in the mower operation mode by, e.g., being pulled by a tractor along a field. Although shown in a substantially perpendicular orientation in FIGS. 1 and 2, it should be understood that the tongue 112 can pivot along axis 124 relative to the chassis 102 as the system 100 moves along the field (see, e.g., FIG. 3). The hydraulic cylinders 122, 101 can be actuated to retract or extend to achieve the desired pivoting position of the tongue 112.

Figure 3:
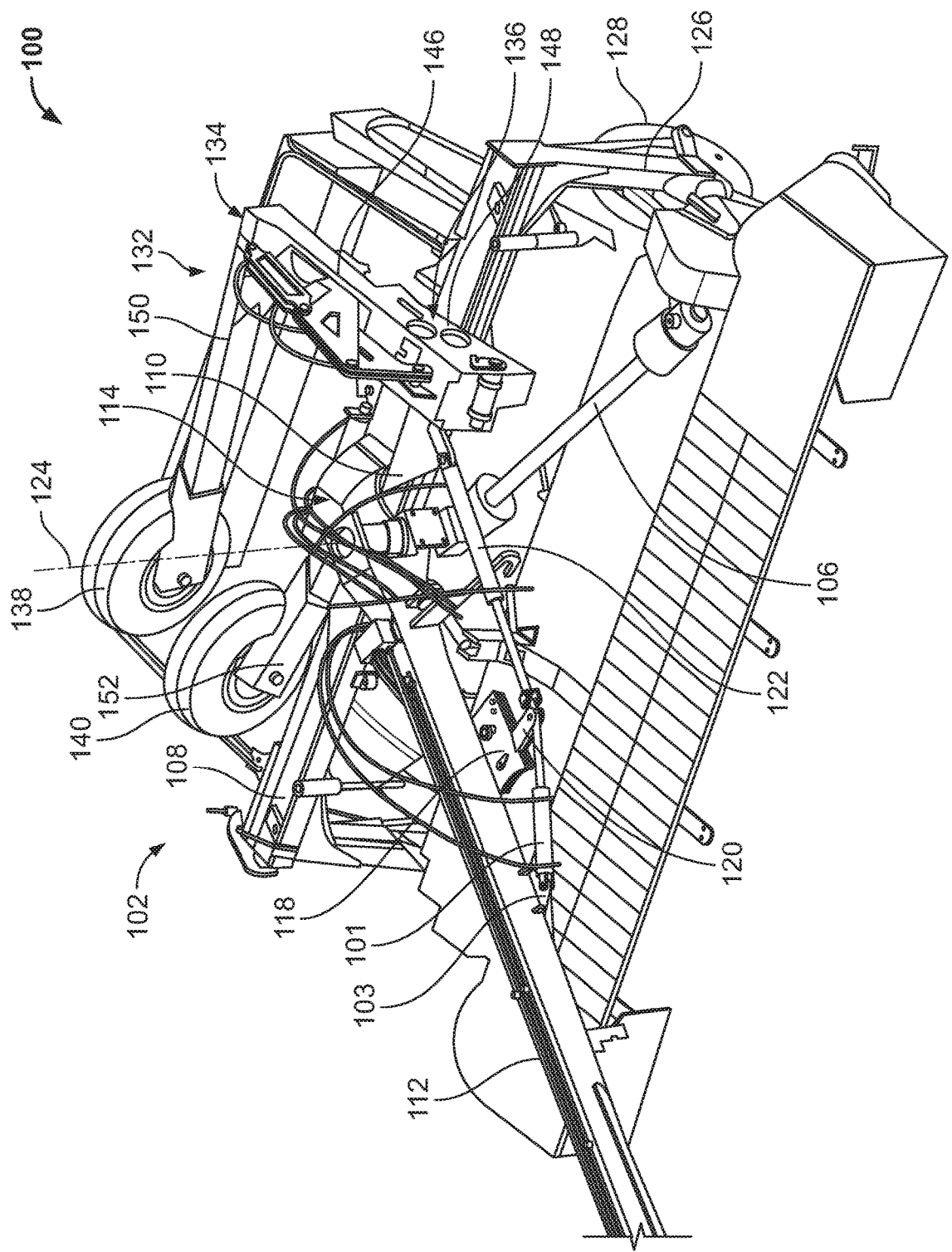
FIG. 3 is a perspective view of an exemplary lateral transport system of FIG. 1 in a header full field left configuration.

In preparation for transport, both hydraulic cylinders 122, 101 can be substantially retracted to maintain the tongue 112 in a substantially perpendicular orientation to the chassis 102. As shown in FIG. 3, the hydraulic cylinder 122 can be fully extended to swing the tongue 112 into a predetermined position that allows the bi-fold cylinder to rotate the suspension element 132 to rotate the transport wheel 138 up and over the chassis 102. During such operation, the hydraulic cylinder 101 remains substantially retracted and remains retracted during the mowing operation and beginning of the transport deployment mode.

FIG. 3 also shows the position of the tongue 112 to provide sufficient clearance for the suspension element 132 to pivot about axis 142 into the partially deployed position. Particularly, the hydraulic cylinders 122, 101 can be actuated to extend to a predetermined position such that the tongue 112 is pivoted to the position shown in FIG. 3. Upon detection of proper positioning of the tongue 112, the suspension element 132 is hydraulically actuated to rotate about axis 142, as shown in FIG. 4, to be positioned on an opposing side of the chassis 102 from the suspension element 136.

Figure 5:
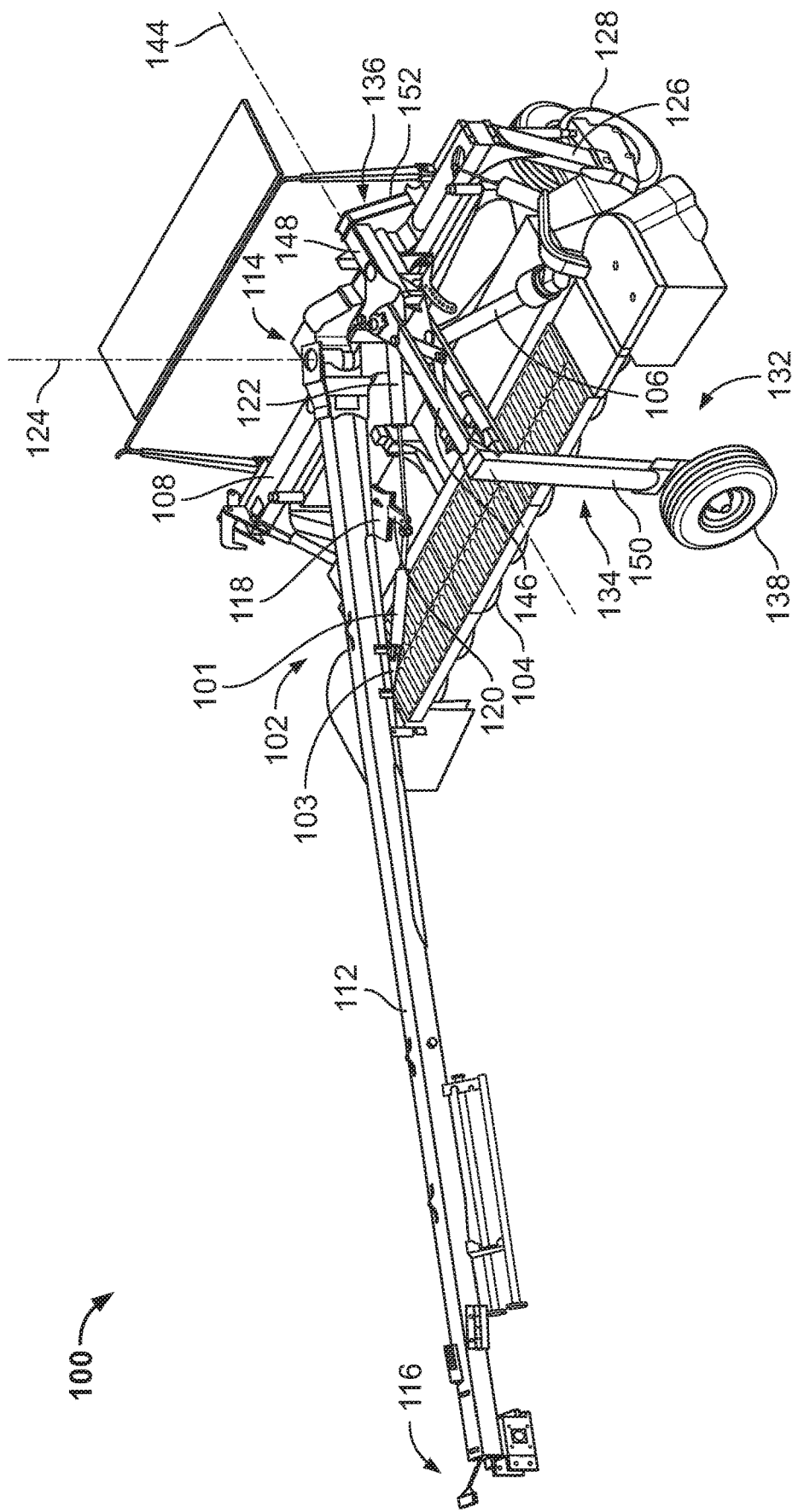
FIG. 5 is a perspective view of an exemplary lateral transport system of FIG. 1 in a drop cylinder deployed configuration.

The lateral transport assembly 132 can be hydraulically actuated to rotate about axis 144, as shown in FIG. 5, to position the wheels 138, 140 against the ground (e.g., a deployed position). In certain embodiments, substantially simultaneously to rotating of the lateral transport assembly 132 (or after the wheels 138, 140 have been positioned against the ground), the wheels 128, 130 associated with the chassis 102 can be actuated to lift upwards, thereby relying on solely the wheels 138, 140 of the lateral transport assembly 132 for support. Rotation of the lateral transport assembly 132 about axis 144 lift the chassis 102 off the ground in preparation for transport.

Figure 6:
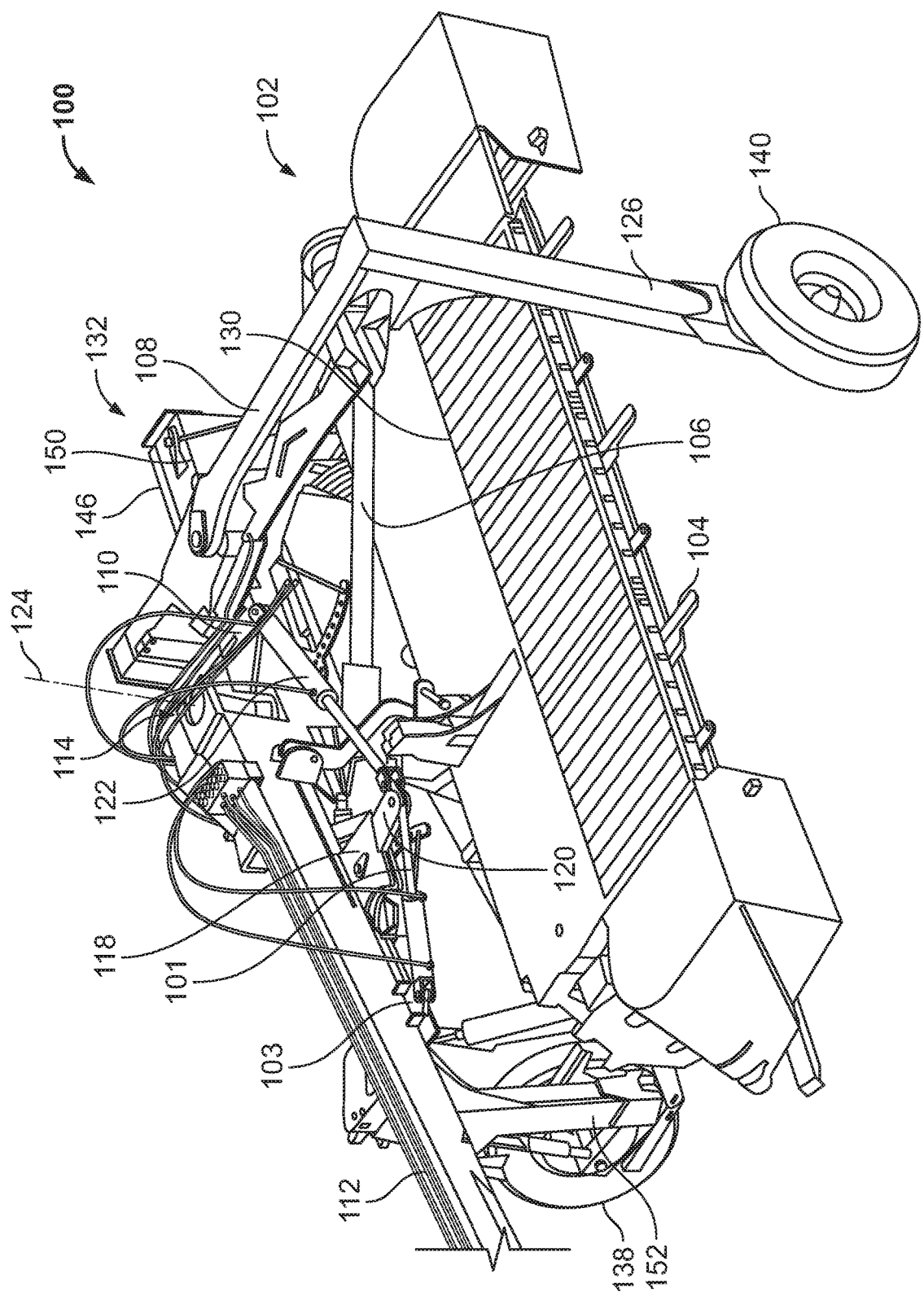
FIG. 6 is a front view of an exemplary lateral transport system of FIG. 1 in a tongue swung to a lateral transport position configuration.
Figure 7:
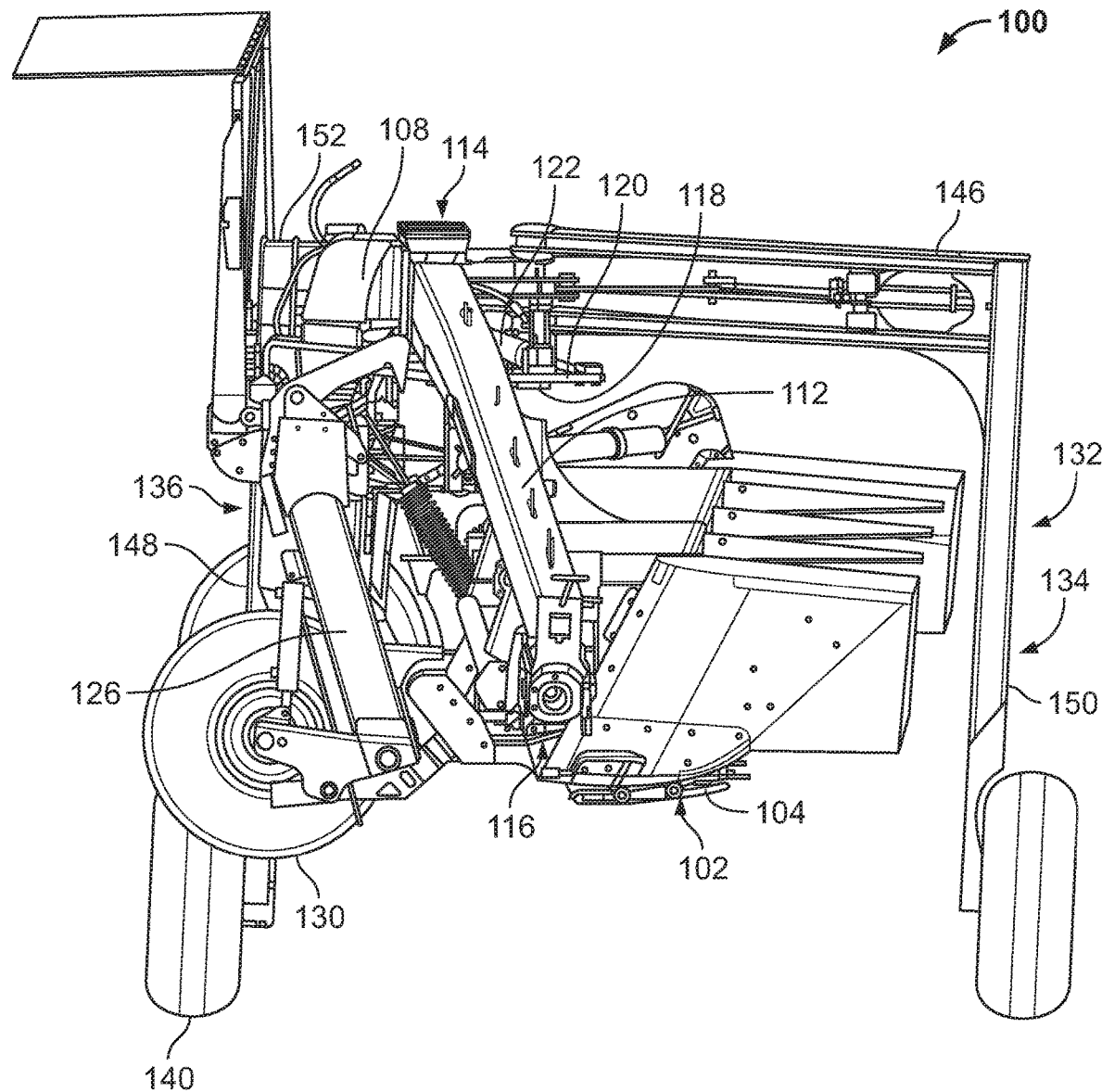
FIG. 7 is a front view of an exemplary lateral transport system of FIG. 1 in a tongue swung to a lateral transport position configuration.
Figure 8:
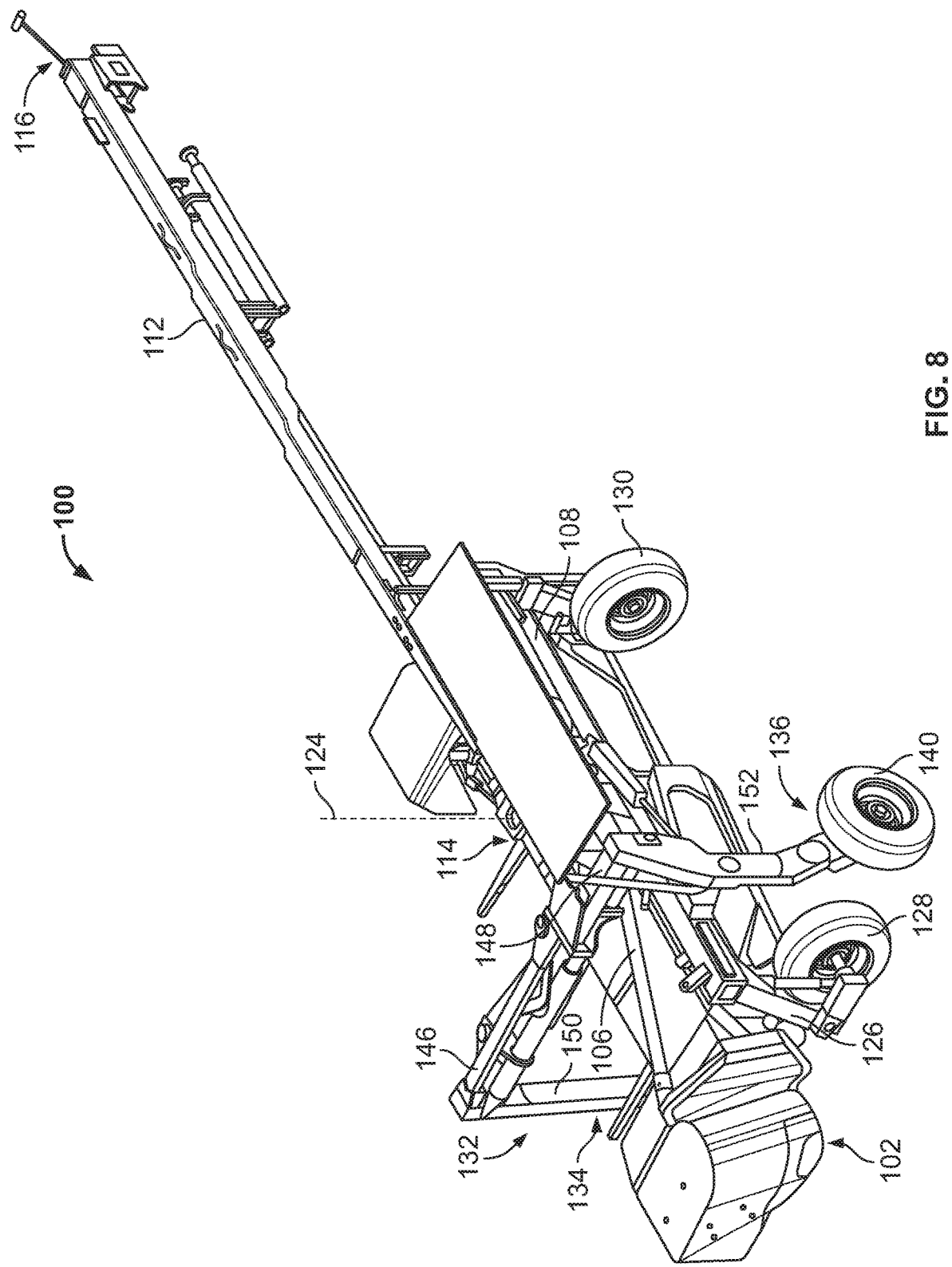
FIG. 8 is a perspective view of an exemplary lateral transport system of FIG. 1 in a lateral transport position configuration.
Figure 9:
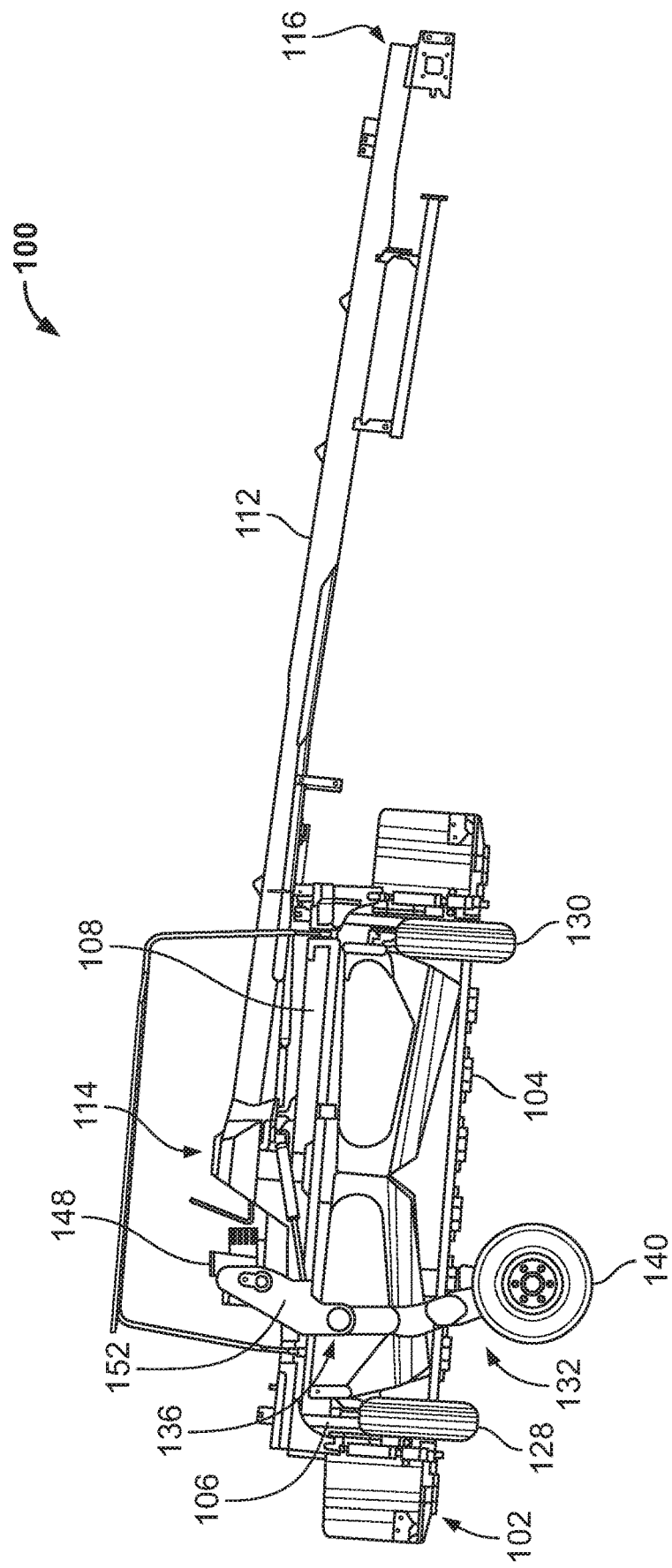
FIG. 9 is a side view of an exemplary lateral transport system of FIG. 1 in a lateral transport position configuration.

After full deployment of the lateral transport assembly 132, the tongue 112 is hydraulically actuated to rotate into the transport position shown in FIGS. 6-9 (e.g., substantially parallel to the frame 108 and laterally extending from the chassis 102). Thus, FIGS. 6-9 show the system 100 in the transport configuration. The system 100 can be coupled to the tractor via the proximal end 116 of the tongue 112 and pulled on the wheels 138, 140 to the desired location. As shown in FIG. 7, the tongue 112 can be slightly angled relative to the chassis 102 in the transport configuration. The sequential steps for configuring the system 100 from the transport configuration to the mower or field configuration are reverse of the discussion above, with the lateral transport assembly 132 being positioned from a transport position to a stowed position.

Particularly, as shown in FIG. 6, after the lateral transport assembly 132 has been rotated to support the chassis 102, the hydraulic cylinder 101 can be actuated to fully extend, swinging the tongue 112 into a lateral position in preparation for transport. During such operation, the hydraulic cylinder 122 remains fully extended. Thus, rather than a single hydraulic cylinder 122 that only partially extends for rotation of the suspension element 132 and fully extends to position the tongue 112 into the lateral position, the system 100 comprises two separate hydraulic cylinders 122, 101 each dedicated to a specific operation. Particularly, the first hydraulic cylinder 122 is fully extended to partially rotate the tongue 112, and the second hydraulic cylinder 101 is fully extended to complete rotation of the tongue 112 after the lateral transport assembly 132 is in the fully deployed position.

Figure 10:
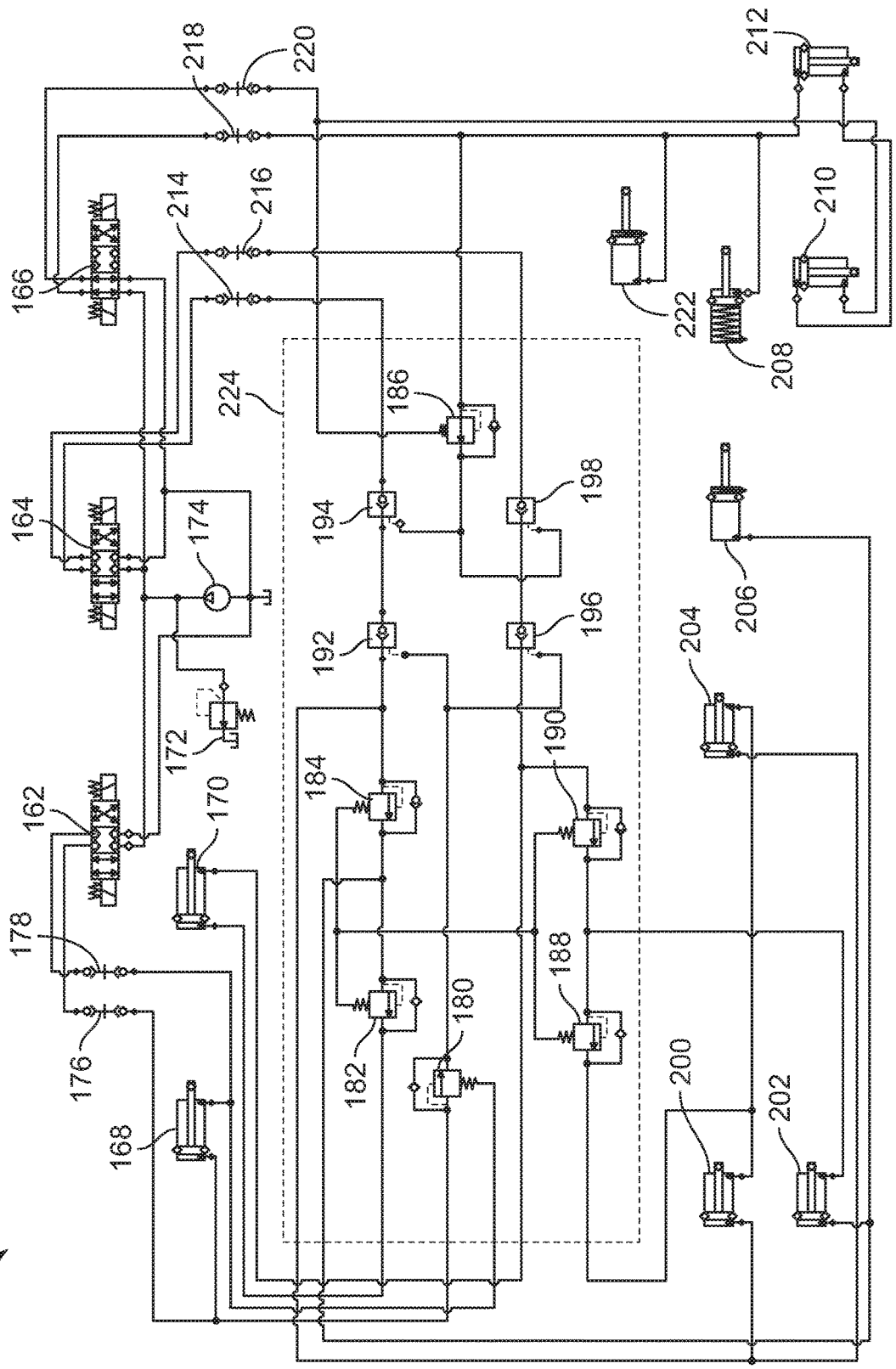
FIG. 10 is a static image of hydraulic circuit for an exemplary lateral transport system of the present disclosure including a series circuit.

With respect to hydraulic actuation for the system 100, compound sequencing is provided with functional lockouts for the lateral transport hydraulics based on mower positioning, lift and pivot location. All of the hydraulic flow is provided by the hydraulic system of the harvester or tractor towing the mower (e.g., system 100). FIG. 10 is a diagram of a hydraulic circuit 160 for the system 100 including a series circuit. The hydraulic circuit 160 for the system 100 can be completely position and pressure based.

The transport hydraulics are only active when the mower is locked in the raised position with the mower swung and locked to tractor left. The lift and swing circuits, controlled by the tractor remotes, are locked to provide pressure to keep the pilot operated checks open to activate the transport hydraulics. The operator can then actuate the transport hydraulics through a third remote system. The operation of the transport hydraulics requires only that the remote is actuated and remains actuated throughout all functions of transport hydraulics. For example, the operator can push the hydraulic control lever and can hold it in place until the transport system is fully deployed. The swing remote can then be unlocked and the lift cylinders retracted, deactivating and locking the transport hydraulics from functioning. Likewise, to return to field mode, the operator can lock lift and swing, and then pulls the transport hydraulics remote until the transport system is completely stowed.

The hydraulic circuit 160 comprises a swing valve 162, a transport valve 164, and a lift valve 166. Such valves can be located on the tractor, not the mower. The hydraulic circuit 160 comprises a first swing cylinder 168, a second swing cylinder 170, a relief valve 172, and a pump 174. The relief valve 172 and pump 174 can be part of the tractor hydraulics. Couplers 176, 178 (e.g., quick connectors) fluidically connect the swing valve 162 to the swing cylinder 168. The hydraulic circuit 160 comprises sequence valves 180-190, and pilot operated check valves 192-198. The hydraulic circuit 160 comprises a bi-fold cylinder 200, a transport cylinder 202, a WRS cylinder 204, and a flail curtain cylinder 206. The hydraulic circuit 160 comprises a tilt cylinder 208, a left-hand side lift cylinder 210, a right-hand side lift cylinder 212, and a tongue transport lockout cylinder 222. Couplers 214, 216 fluidically connect the transport valve 164 to respective pilot operated (PO) check valves 194, 198, coupler 218 fluidically connects the lift valve 166 to the tongue transport lockout cylinder 222, the tilt cylinder 208, and the right-hand side lift cylinder 212, and coupler 220 fluidically connects the lift valve 166 to the valve 186 and cylinder 210. The manifold 224 is represented by the components within the dashed line and is mounted on the mower.

The directional valves 162-166, the pump 174 and the relief valve 172 can be part of the harvester or tractor, and the remaining components can be part of the mower and connect to the harvester or tractor hydraulic remotes via couplers 176, 178, 214, 216, 218, 220. The circuit 160 is in series due to the arrangement of the sequence valves 180-190 which require that all flow travel through the previous sequence valve in order to flow to the next sequence valve. Not all lateral transport mowers are equipped with a flail curtain cylinder 206, a tilt cylinder 208, and/or a transport lockout cylinder 222. Therefore, the circuit 160 is capable of functioning without these components. However, these components are show in FIG. 10 to encompass all potential functions of a standard mower.

In operation, to configure the hydraulic circuit 160 from a field or stowed to a transport or deployed mode, pressure is supplied to extend left-hand side and right-hand side lift cylinders 210, 212 through coupler 218. When the cylinders 210, 212 are fully extended, the pressure trips the sequence valve 186, which opens the check valves 194, 198. Pressure is supplied to the barrel end of the swing cylinder 168 from coupler 176 to swing the mower to the full field left position. When the swing cylinder 168 is fully extended, the pressure trips sequence valve 180, which opens check valves 192, 196. At this point, the mower is positionally ready to operate the lateral transport hydraulics.

The operator must first lock the actuating levers for couplers 176, 218. If not locked, the residual pressure holding the lift cylinders 210, 212 and swing cylinder 168 in the extended position will not be adequate to keep the sequence valves 180, 186 open. The circuit 160 design is intended to require the operator to have two functions on the mower locked before the lateral transport hydraulics can be operable. Such design acts as a safety feature to ensure that unintentional deployment of the lateral transport system during mowing operation due to the operator inadvertently activating the lever controlling the lateral transport hydraulics does not occur.

Pressure is supplied from coupler 214 to extend the WRS cylinder 204 to fold the windrower shields in, and extends the bi-fold cylinder 200 to flip the left-hand side transport wheel from the back to the front of the trail frame (see, e.g., FIG. 4). These functions do not interfere with one another, and are therefore plumbed in parallel. When the WRS cylinder 204 and bi-fold cylinder 200 have been fully extended, pressure from the cylinders 200, 204 trips sequence valve 184, which provides flow extending the transport cylinder 202. This function rotates the transport wheels down to the ground, lifting the mower up on the transport wheels (see, e.g., FIG. 5). For flail conditioner equipped mowers, a flail cylinder 206 plumbed parallel to the transport cylinder 202 extends lifting the flail curtain up for transport.

When the transport cylinder 202 has been fully extended, the pressure trips sequence valve 182, providing flow to the second swing cylinder 170 (e.g., hydraulic cylinder 101 of FIGS. 1-9). The cylinder 170 extends, rotating the mower from the full field left position to the transport position, where the header is in-line with the tongue of the mower, providing a narrow road transport width (see, e.g., FIG. 6). The lever controlling coupler 176 is unlocked, which allows check valves 192, 196 to close. To lock out the lateral transport hydraulics, the lever controlling coupler 218 is unlocked and moved in the opposite direction, providing flow through the valve 218 to the rod ends of the lift cylinders 210, 212, thereby lifting the wheels up and providing ground clearance while also providing a secondary lockout for the lateral transport hydraulics.

In operation, to reconfigure the mower from the transport mode to a mowing or field mode, the reverse operations from those described above can be taken place except for the distinctions noted herein. Particularly, pressure is still supplied from couplers 176, 218, extending the lift cylinders 210, 212 and swing cylinder 168 with the levers locked to continue to provide pressure during lateral transport hydraulic operation. Flow is provided to the lateral transport hydraulics from coupler 216 to perform the lateral transport sequence in reverse of the above-described process.

The disclosed circuit 160 is completely mechanical position and pressure based, which does not require electrohydraulics for operation. As will be discussed below, the hydraulics can be plumbed in series or in parallel, although a series circuit provides simplicity of manufacturing of the hydraulic manifold. Use of the position of the lift cylinders and swing cylinder trips the sequence valves and open check valves in order to allow for operation of the lateral transport hydraulics. The operator maintains pressure on the lift and swing cylinders during lateral transport deployment in order for the lateral transport hydraulic system to function. The above-described sequence can be used to perform the required tasks of the bi-fold lateral transport system.

Figure 11:
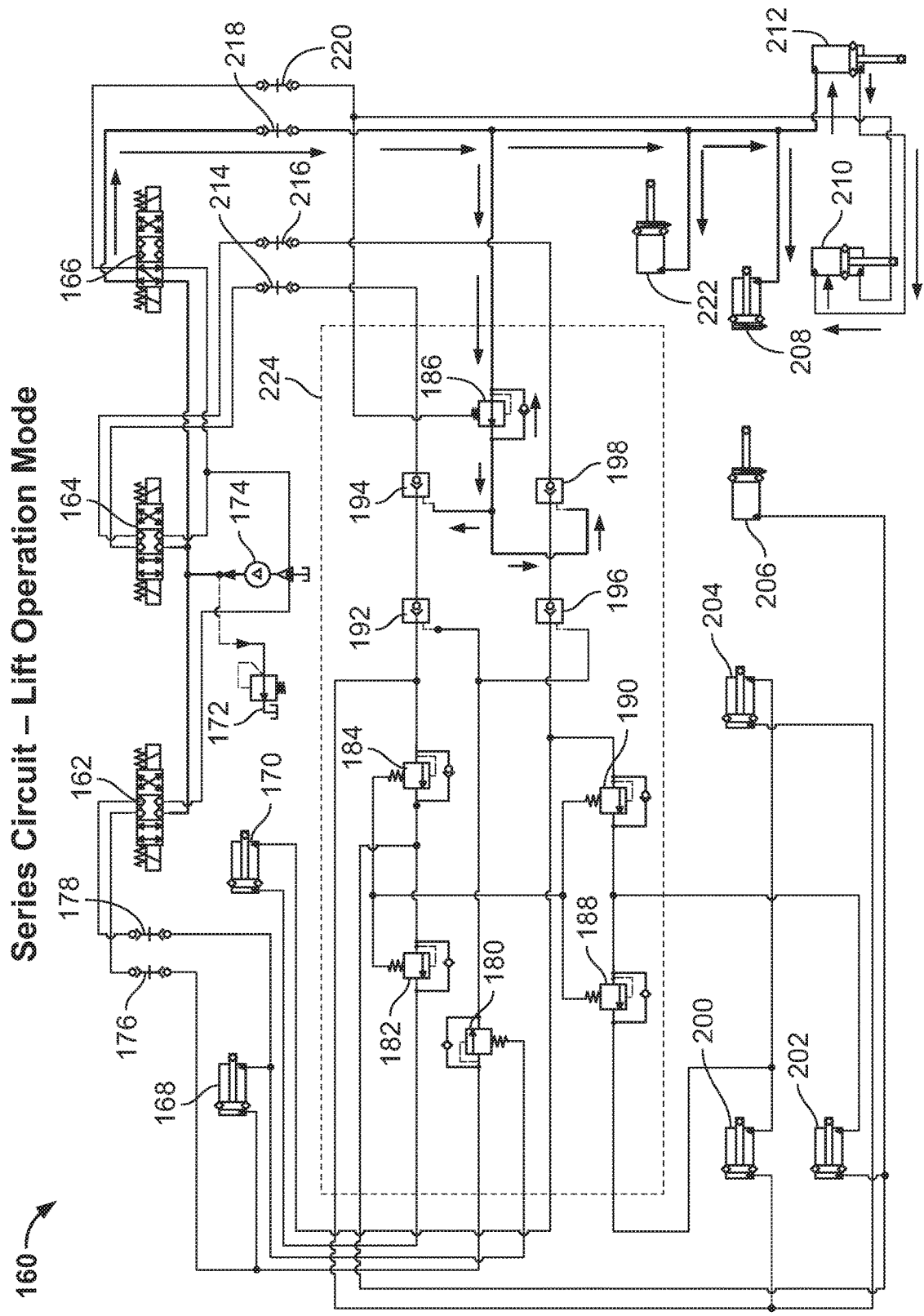
FIG. 11 is the hydraulic circuit of FIG. 10 in a lift operation mode.

FIGS. 11-16 show the sequential steps of the hydraulic circuit 160 for reconfiguring the lateral transport assembly from a stowed position to a transport position. FIG. 11 shows the hydraulic circuit 160 in a lift cylinder operation mode during a raise operation. The lift valve 166 is shifted to extend the lift cylinders 210, 212, thereby raising the mower. Such operation trips the sequence valve 186 and opens check valves 194, 198. During the lift function, the tilt cylinder 208 retracts and the tongue lockout cylinder 222 extends. As noted above, neither of these functions are required for operation of the lateral transport system and are included for mowers having such cylinders 208, 222.

Figure 12:
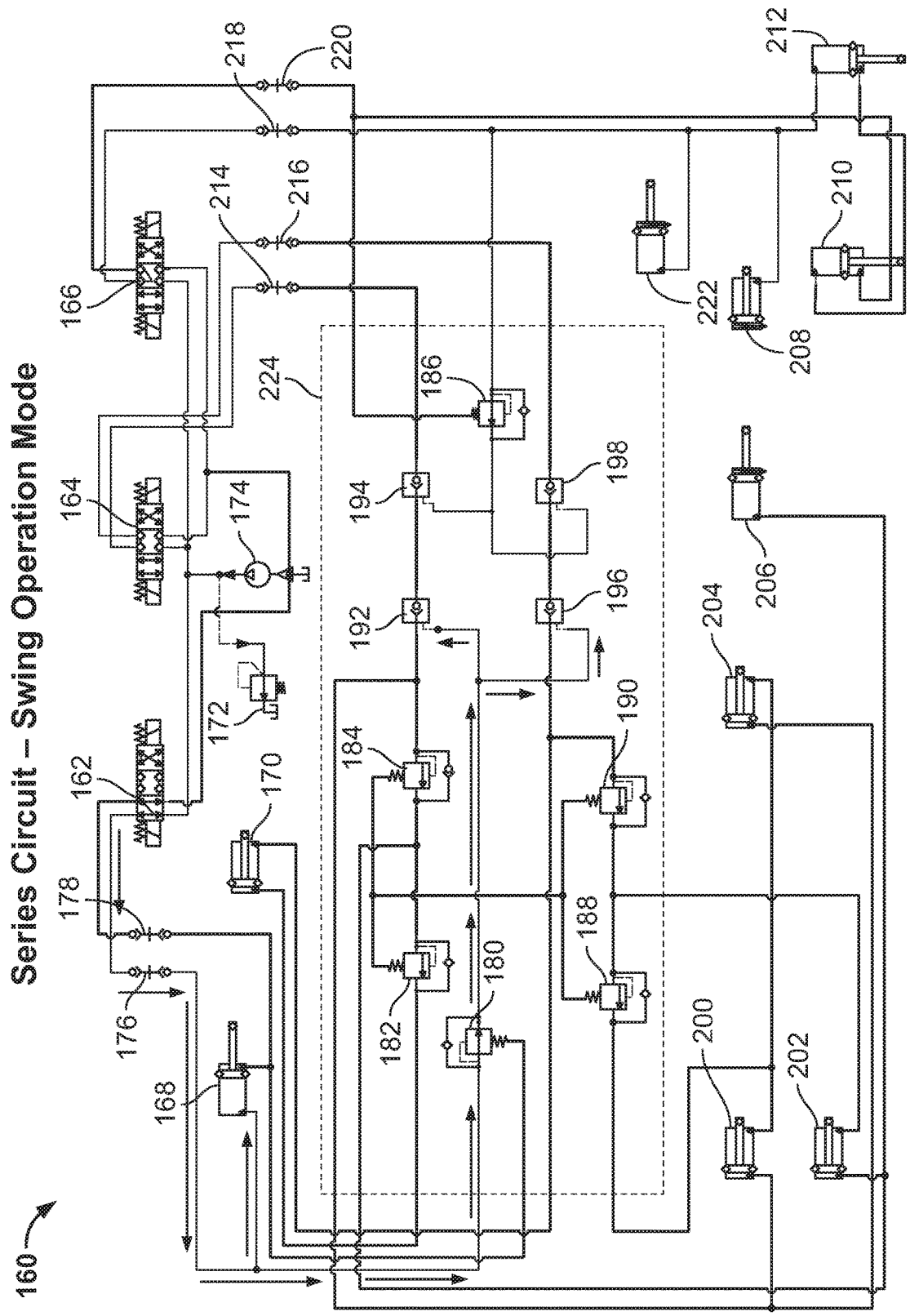
FIG. 12 is the hydraulic circuit of FIG. 10 in a swing operation mode.
Figure 13:
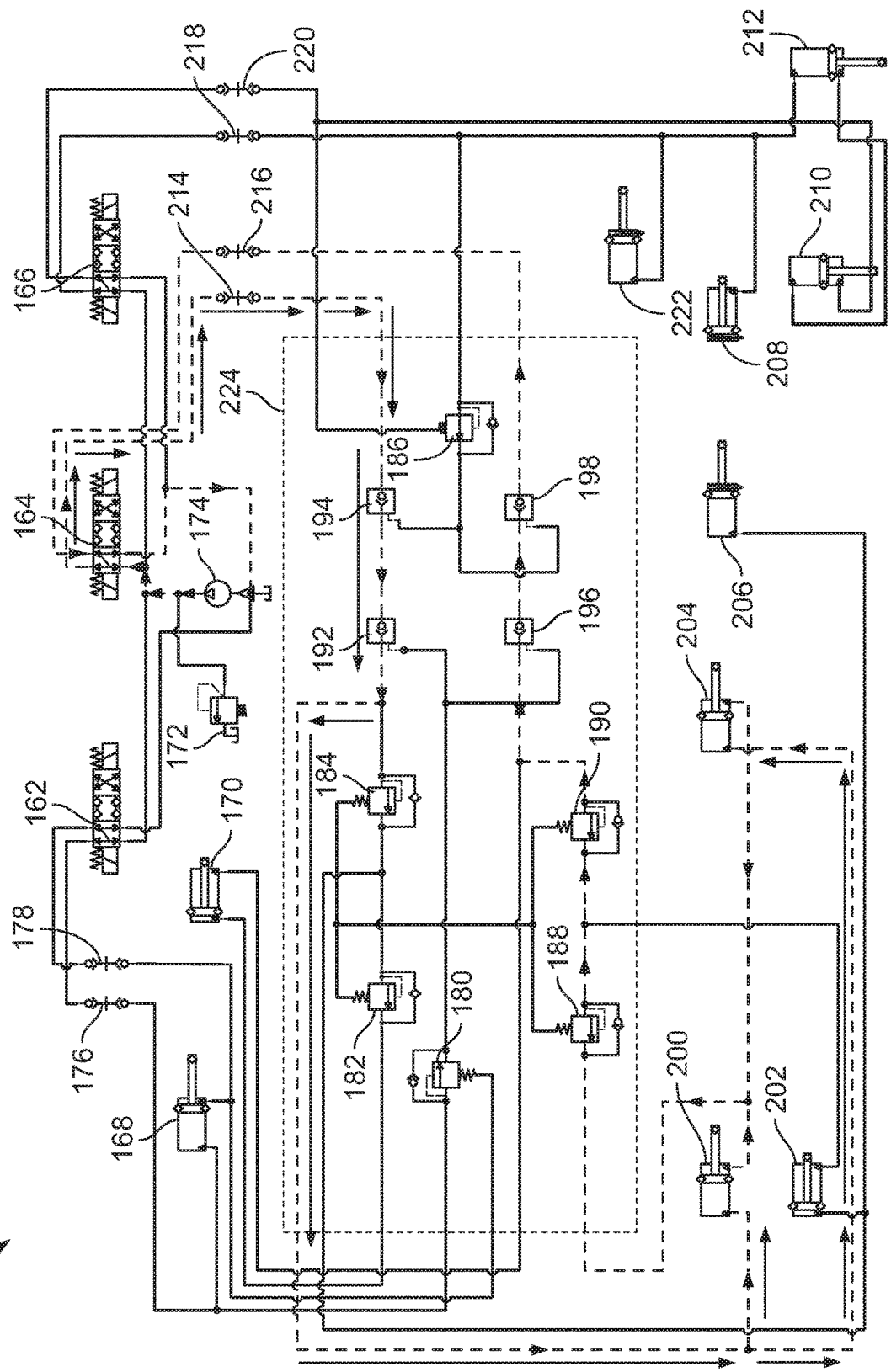
FIG. 13 is the hydraulic circuit of FIG. 10 in step one of a transport deployment operation mode.

FIG. 12 shows the hydraulic circuit 160 in a swing cylinder operation mode during swing operation. The swing valve 162 is shifted to extend the swing cylinder 168, thereby swinging the mower to full swing right or left depending on the design of the system (left in the figures discussed above). Such operation trips the sequence valve 180 and opens check valves 192, 196.

FIGS. 13-16 show steps one to four of the hydraulic circuit 160 in the transport deployment operation mode (e.g., field to road deployment). In step one of FIG. 13, the lift cylinders 210, 212 are fully extended and the lift valve 166 is locked in the lift position, forcing the check valves 194, 198 to remain open. The swing cylinder 168 is fully extended and the swing valve 162 is locked into the extended position, with check valves 192, 196 remaining open. The transport valve 164 is shifted and locked in the position throughout deployment to provide flow through check valves 192, 194 to extend the bi-fold cylinder 200 and WRS cylinder 204 (if equipped).

Figure 14:
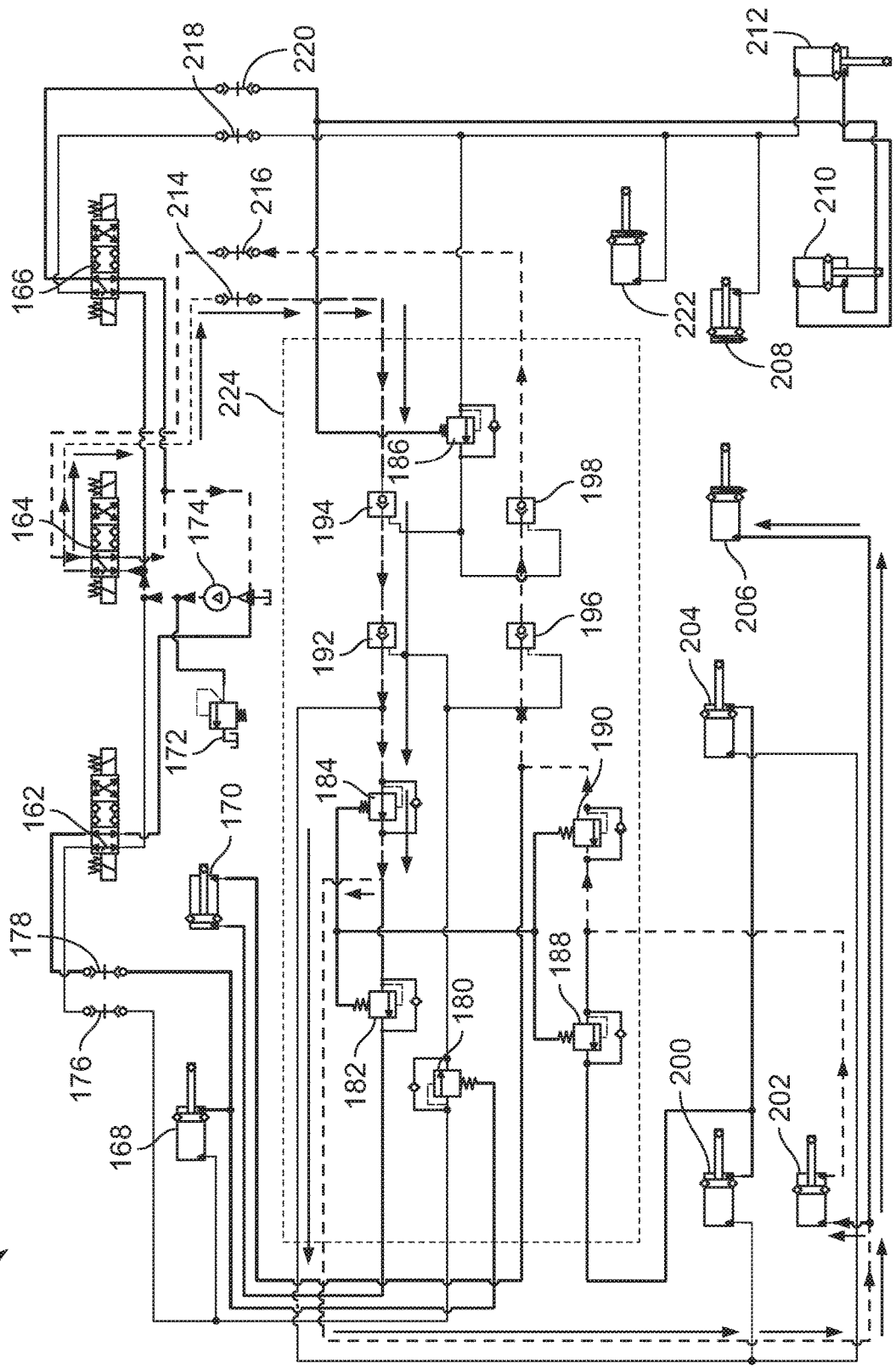
FIG. 14 is the hydraulic circuit of FIG. 10 in step two of a transport deployment operation mode.

In step two of FIG. 14, the lift, swing and transport valves 166, 162, 164 remain locked for the transport function to continue. The bi-fold cylinder 200 is extended completely and sequence valve 184 is tripped to allow flow to the transport cylinder 202. The flail curtain is raised with the flail curtain cylinder 206 (if equipped).

Figure 15:
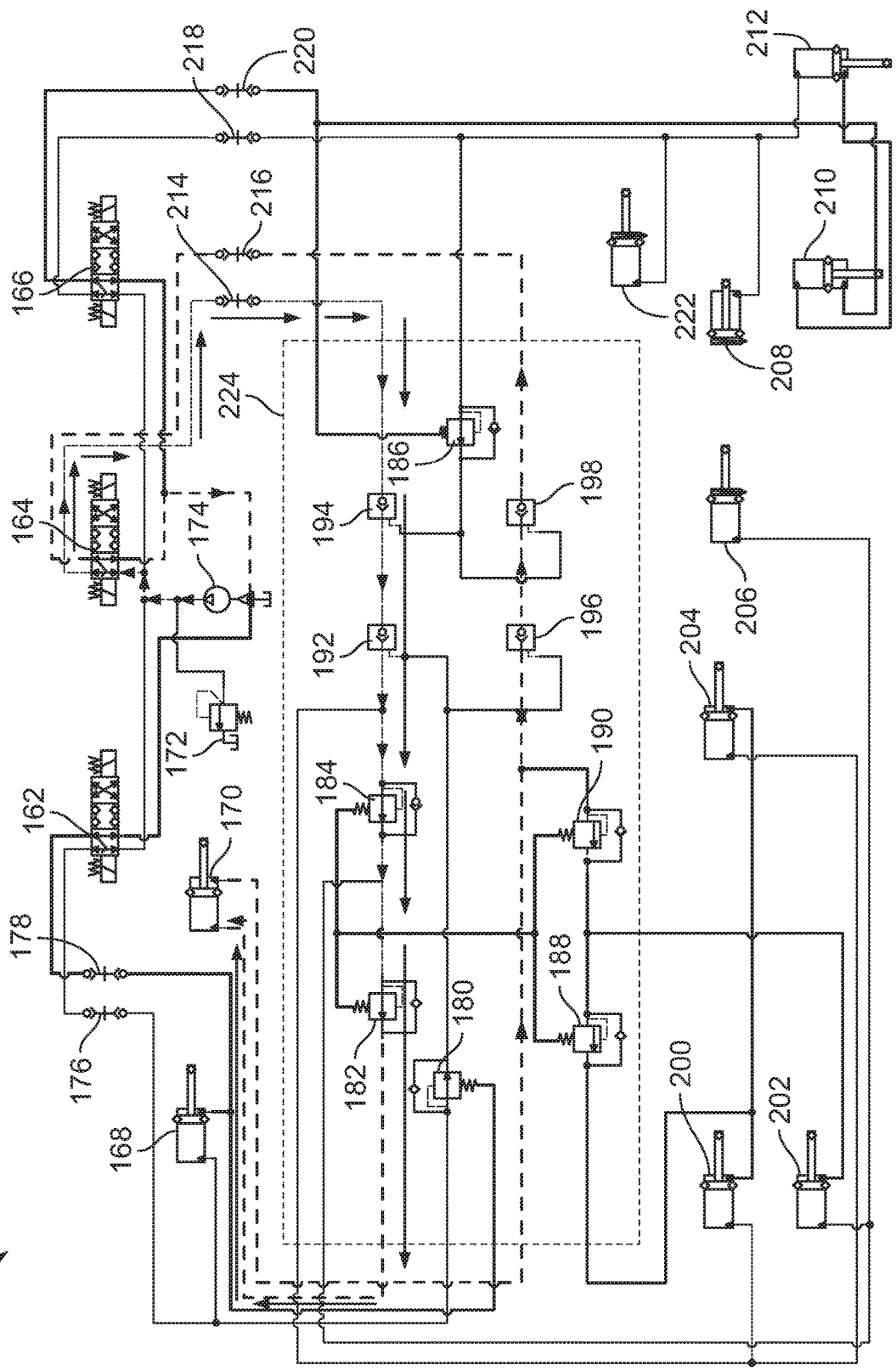
FIG. 15 is the hydraulic circuit of FIG. 10 in step three of a transport deployment operation mode.

In step three of FIG. 15, the lift, swing and transport valves 166, 162, 164 remain locked for the transport function to continue. The transport cylinder 202 is extended completely and sequence valve 182 is tripped to allow flow to the second swing cylinder 170.

Figure 16:
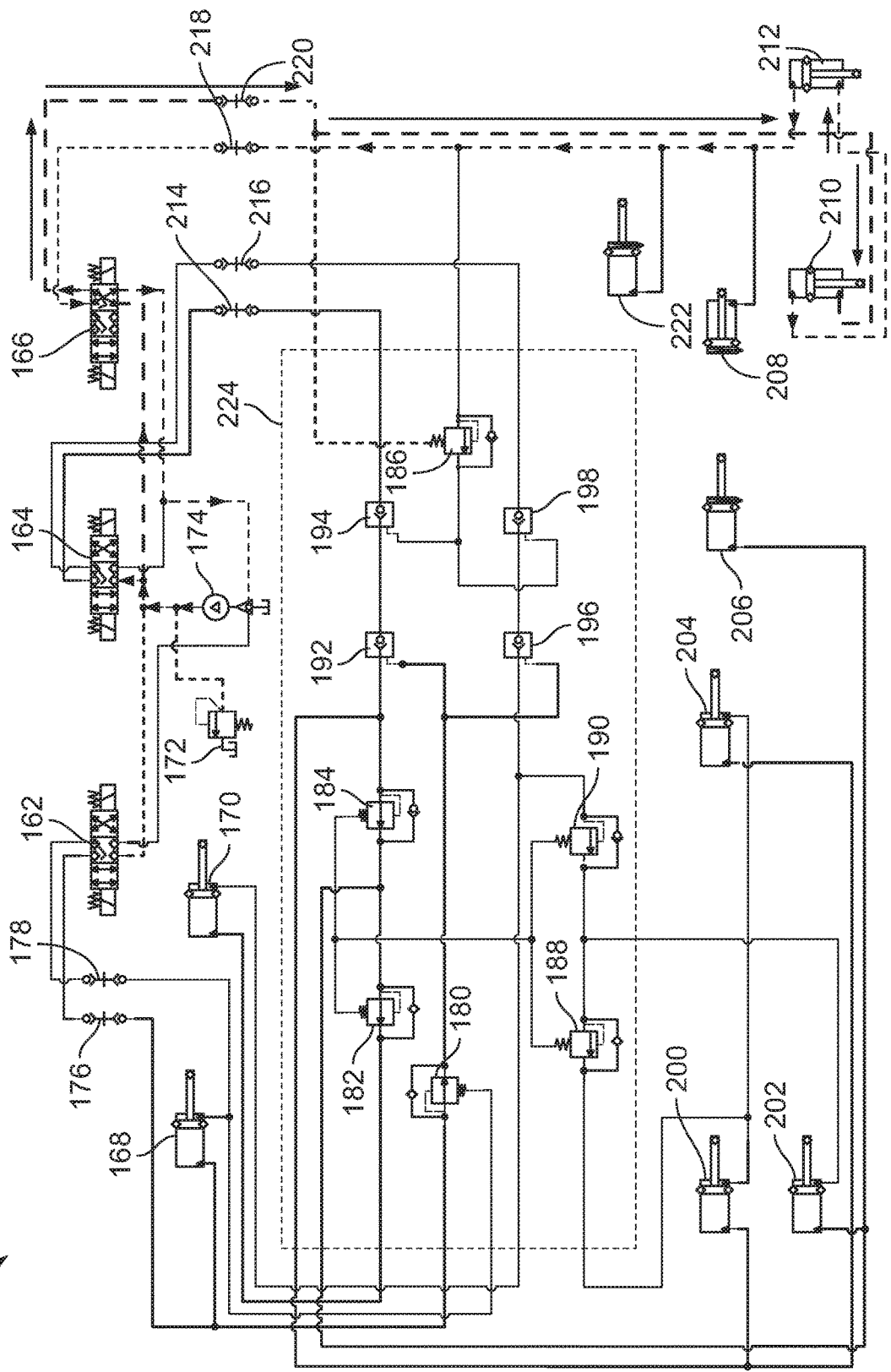
FIG. 16 is the hydraulic circuit of FIG. 10 in step four of a transport deployment operation mode.

In step four of FIG. 16, the second swing cylinder 170 function is complete. The transport and swing valves 164, 162 are shifted to a blocked position. The lift valve 166 is shifted to a lower position which lifts the field wheels up to increase ground clearance while also engaging the tongue lockout cylinder 222 (if equipped).

Figure 17:
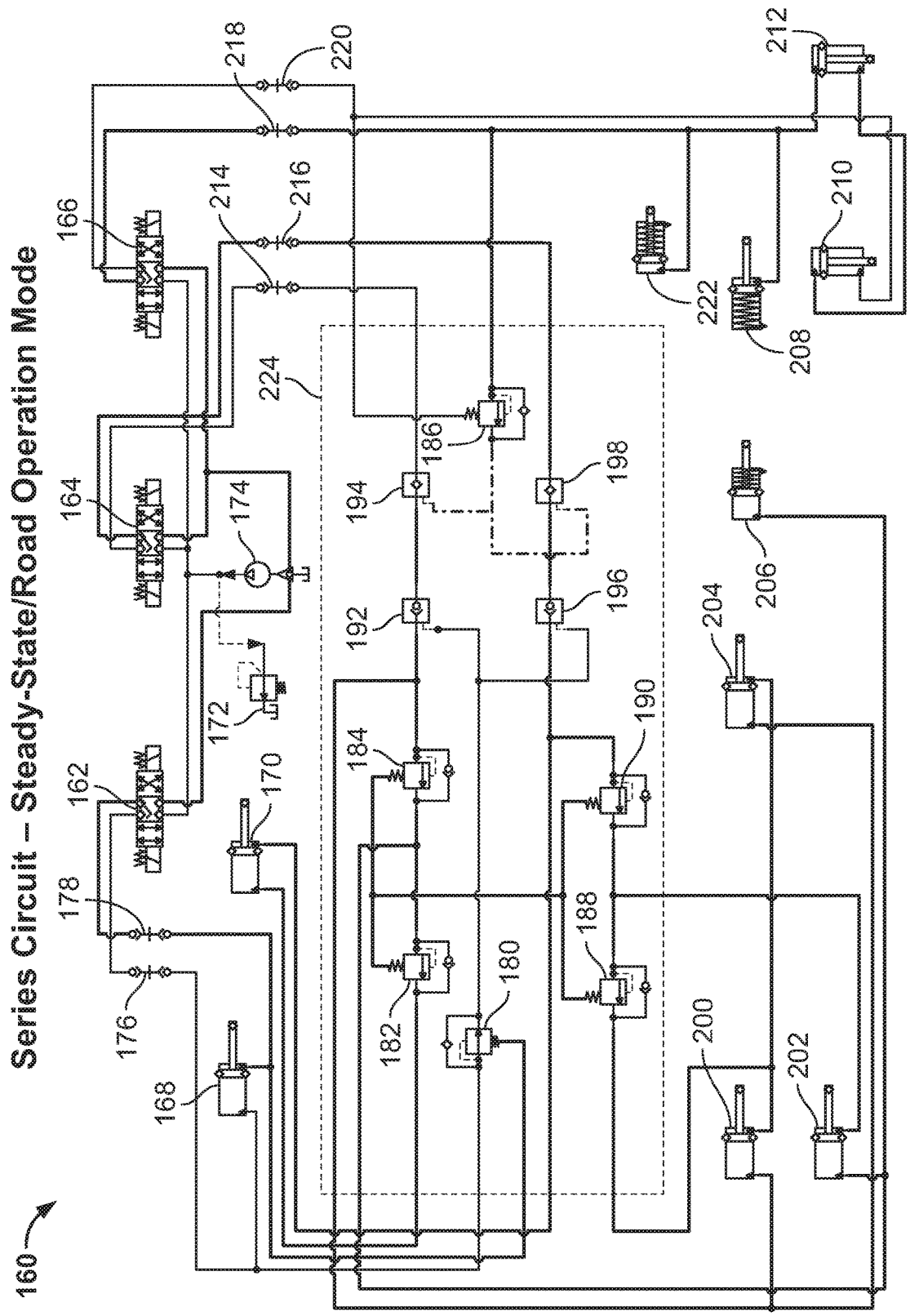
FIG. 17 is the hydraulic circuit of FIG. 10 in a steady-state/road operation mode.
Figure 18:
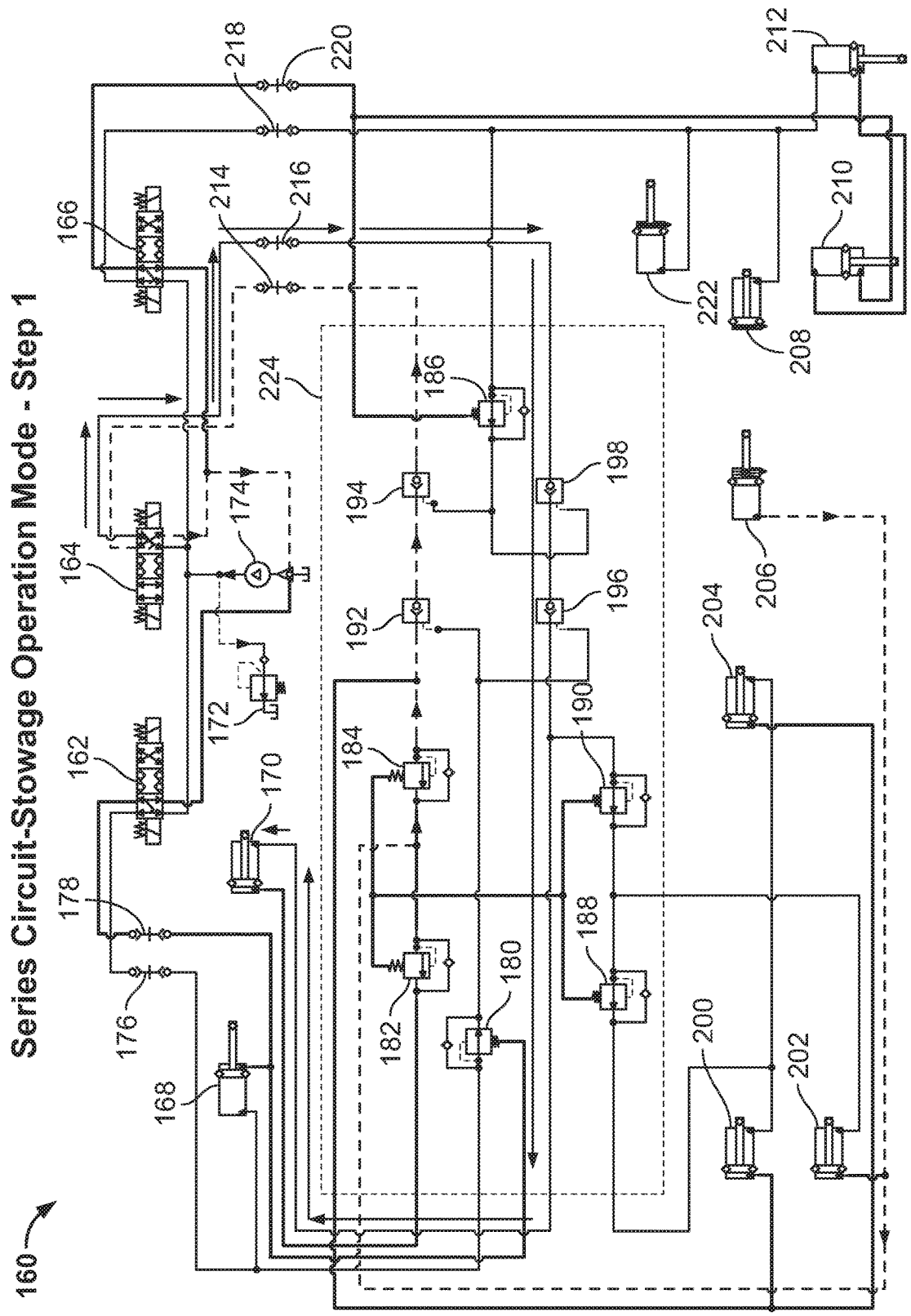
FIG. 18 is the hydraulic circuit of FIG. 10 in step one of a stowage operation mode.

FIG. 17 is the hydraulic circuit 160 in a steady-state transport/road operation mode. Retraction of the lift cylinders 210, 212 closes the check valves 194, 198, disabling the transport deployment function during transport operation. The check valves 194, 198 render the transport hydraulic system non-functional at any time when the lift and swing cylinders 210, 212, 168, 170 are not fully extended, and the lift and swing valves 166, 162 are not locked in the extend position. The lockout system keeps the transport system from activating during the mowing or road transport operation.

FIGS. 18-21 show steps of the hydraulic circuit 160 from the transport, road operation to a stowed, field operation. In step one of FIG. 18, the lift valve 166 shifts to extend the lift cylinders 210, 212, tripping sequence valve 186 and opening check valves 194, 198. The swing valve 162 shifts to pressurize the swing cylinder 168, tripping sequence valve 180 and opening check valves 192, 196. The transport valve 164 shifts to provide flow through the check valves 196, 198 to retract second swing cylinder 170. The transport valve 164 remains locked in the shown position.

Figure 19:
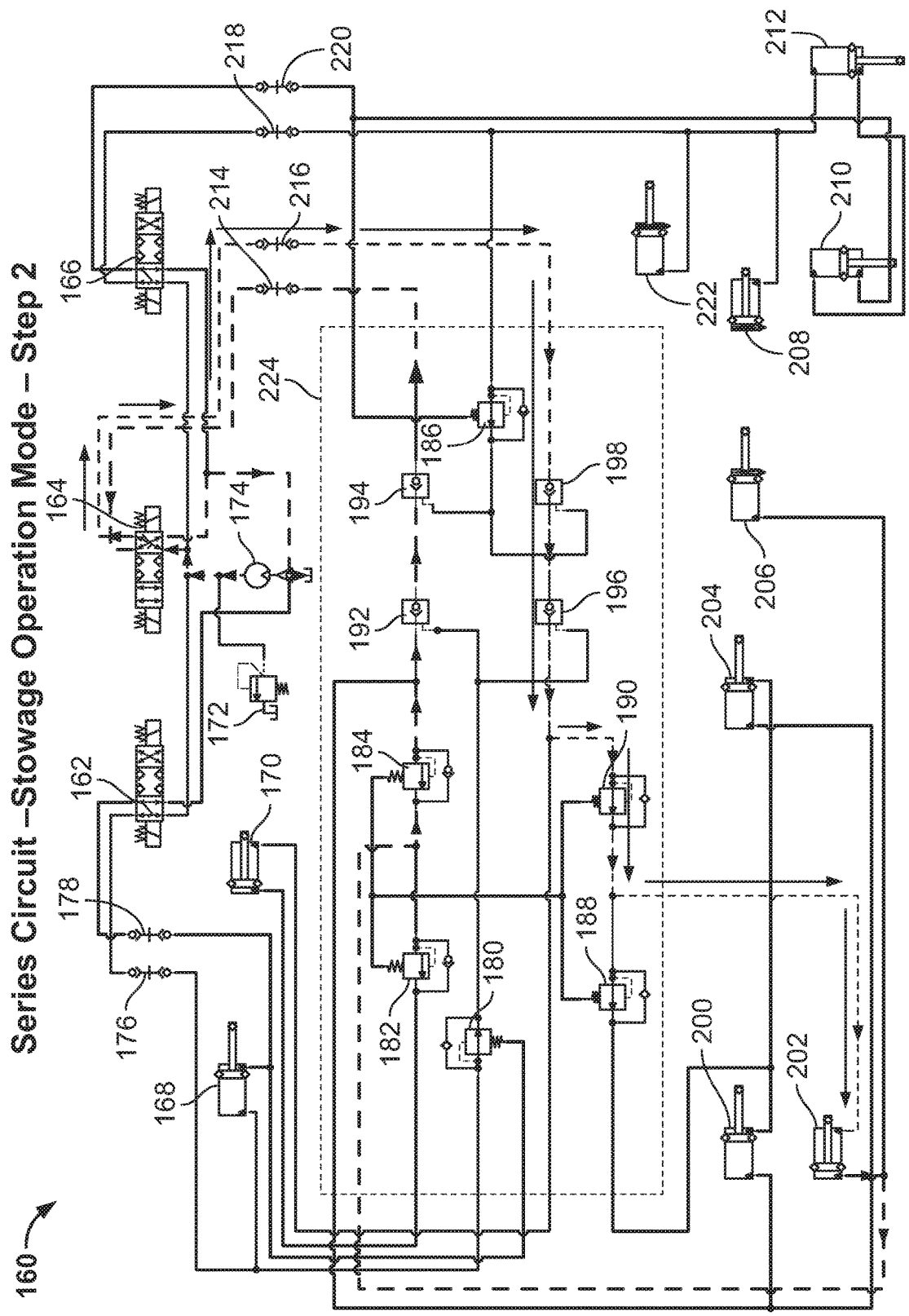
FIG. 19 is the hydraulic circuit of FIG. 10 in step two of a stowage operation mode.

In step two of FIG. 19, the lift and swing valves 166, 162 remain shifted and locked to keep the check valves 192-198 open. The transport valve 164 remains locked. After the second swing cylinder 170 is fully retracted, sequence valve 190 trips allowing flow to retract the transport cylinder 202.

Figure 20:
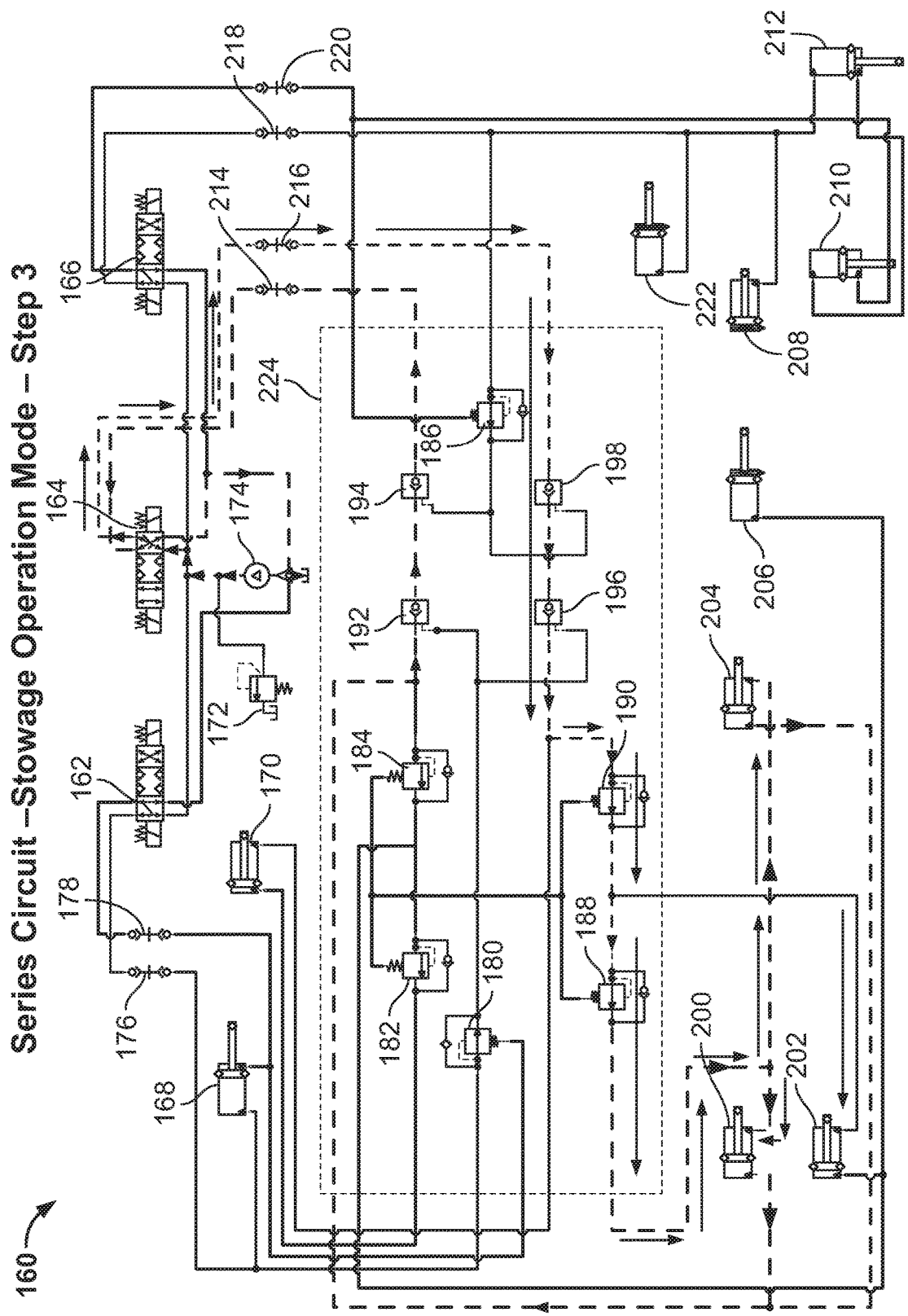
FIG. 20 is the hydraulic circuit of FIG. 10 in step three of a stowage operation mode.

In step three of FIG. 20, the lift and swing valves 166, 162 remain shifted to keep the check valves 192-198 open. The transport valve 164 remains locked. After the transport cylinder 202 has fully retracted, sequence valve 188 trips and allows flow through to retract the bi-fold cylinder 200. Such flow also retracts the WRS cylinder 204 (if equipped).

Figure 21:
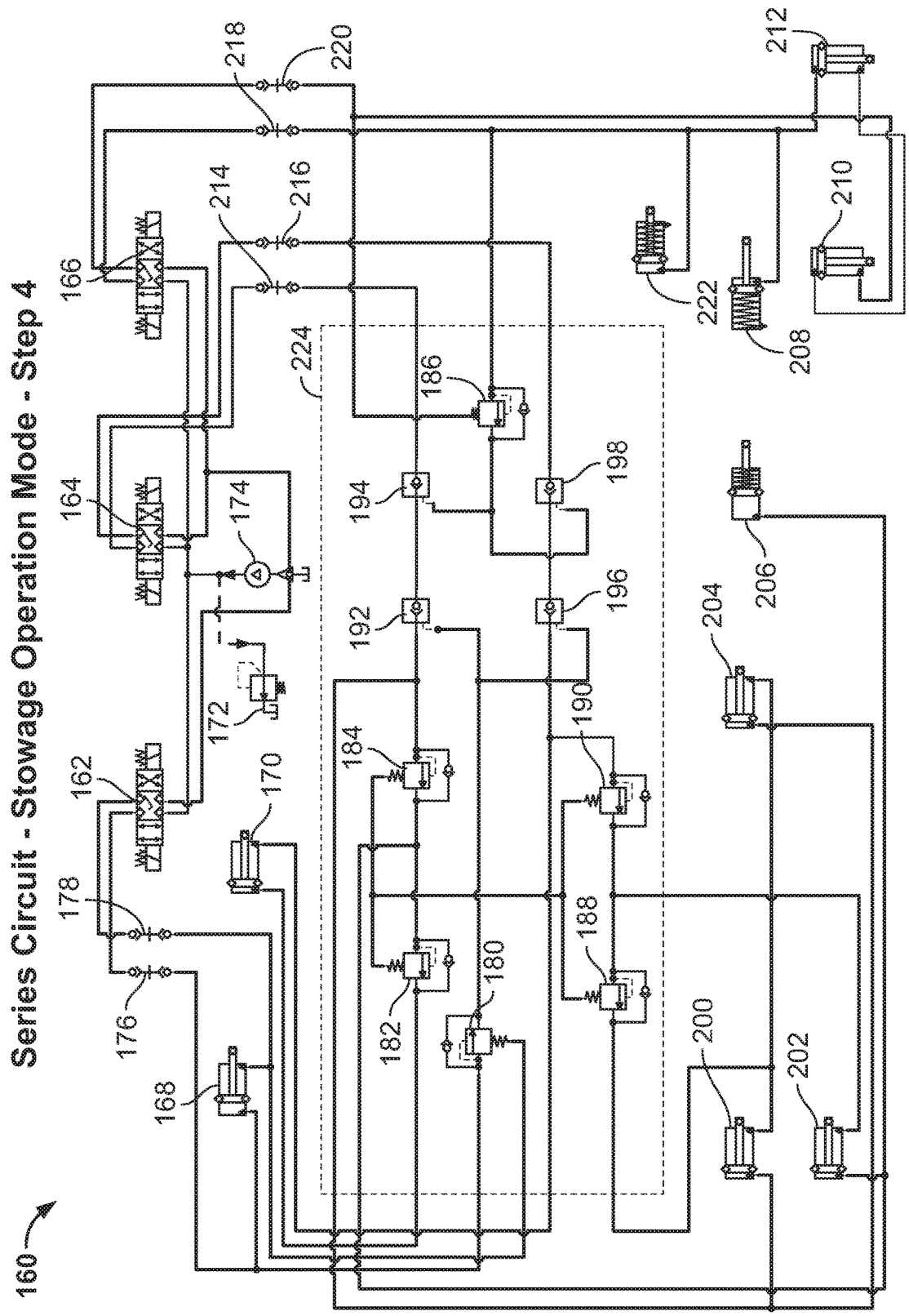
FIG. 21 is the hydraulic circuit of FIG. 10 in step four of a stowage operation mode.

In step four of FIG. 21, the bi-fold cylinder 200 is retracted along with the WRS cylinder 204 (if equipped), and the transport valve 164 shifts to the closed position. The lift and swing valves 166, 162 are shifted to the closed positions, closing check valves 192-198 and locking out the transport hydraulics from operation. The transport hydraulics will not function while the swing and lift cylinders 210, 212, 168 are not fully extended and the valves 166, 162 are not locked in the extended positions.

Figure 22:
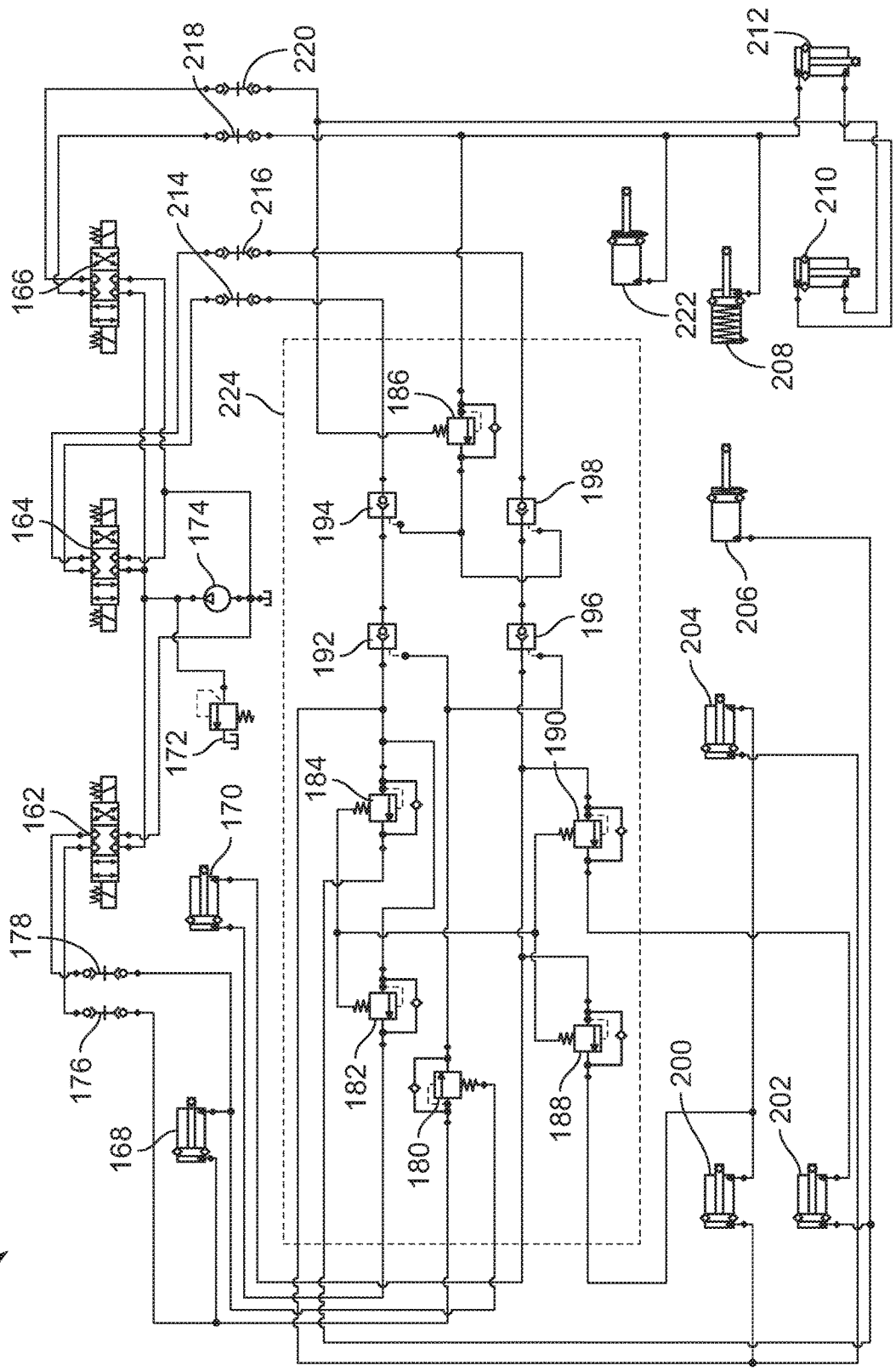
FIG. 22 is a static image of hydraulic circuit for an exemplary lateral transport system of the present disclosure including a parallel circuit.

FIG. 22 is a diagram of a hydraulic circuit 230 for the system 100 including a parallel circuit. The circuit 230 can comprise the same components as the circuit 260 and, therefore, like reference numbers are used to refer to like structures. FIGS. 23-33 show the sequential steps of the hydraulic circuit 230 for reconfiguring the lateral transport assembly from a stowed position to a transport position, and back. Particularly, FIGS. 23-28 show the sequential steps of the hydraulic circuit 230 for reconfiguring the lateral transport assembly from the stowed position to the transport position, FIG. 29 shows the hydraulic circuit 230 during the steady-state/road operation mode, and FIGS. 30-33 show the sequential steps of the hydraulic circuit 230 for reconfiguring the lateral transport assembly from the transport position to the stowed position.

In FIG. 22, the system is parallel due to the arrangement of the sequence valves 180-190 which do not require flow to go through previous sequence valves during the subsequent operation, improving efficiency of the system. Each successive sequence valve 180-190 requires a much higher crack pressure than the previous valve 180-190. For example, the crack pressure of the sequence valve 182 is substantially higher than the crack pressure of the sequence valve 184, allowing the transport cylinder 202 to extend completely before cracking valve 182. The components of the circuit 230 should therefore be chosen to reflect the sizing requirements. Not all lateral transport mowers are equipped with a flail curtain cylinder 206, a tilt cylinder 208, or a transport lockout cylinder 222, and the system can operate without such cylinders. However, the circuit 230 comprises these cylinders to illustrate functionality of a standard mower.

Figure 23:
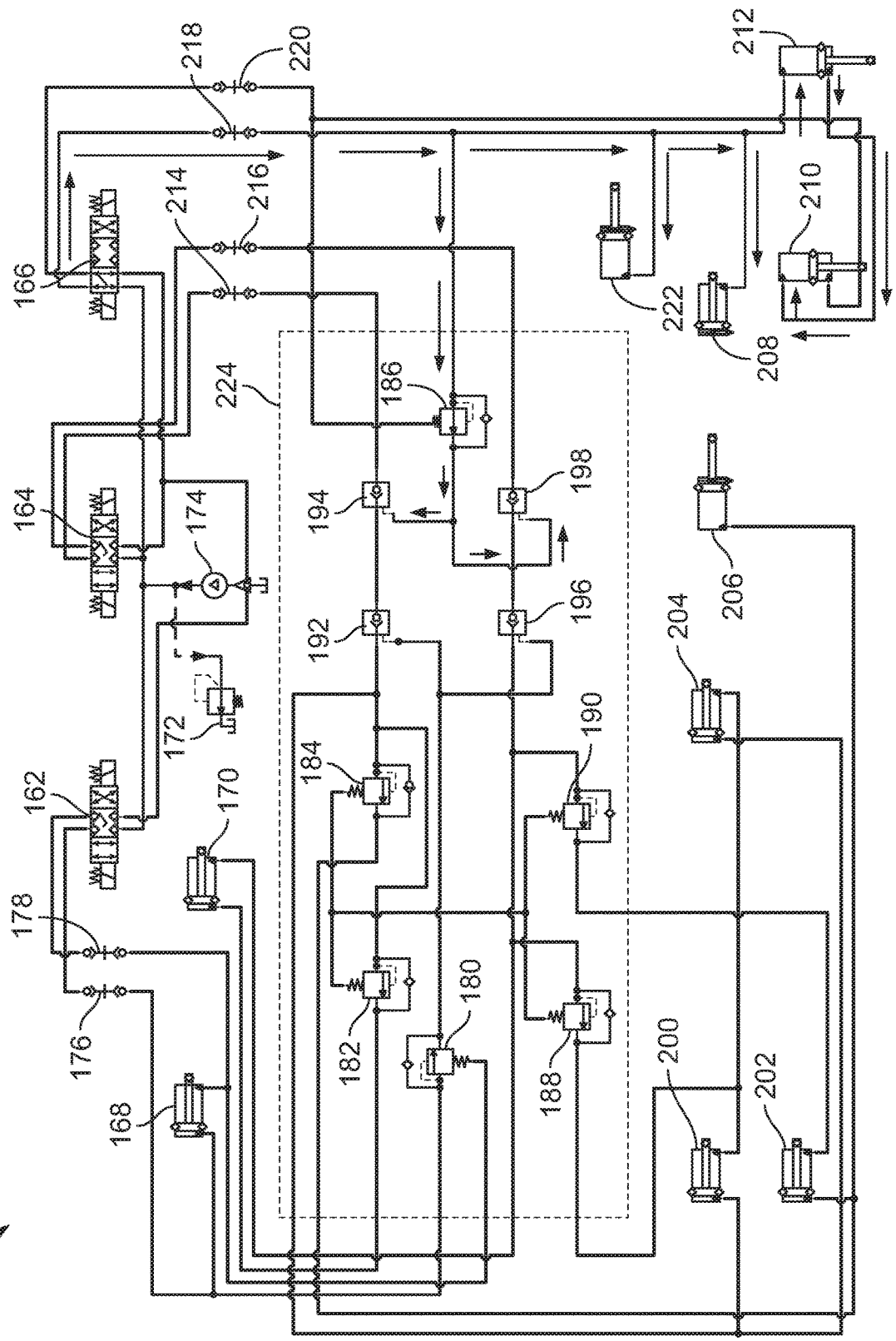
FIG. 23 is the hydraulic circuit of FIG. 22 in a lift operation mode.

In FIG. 23, during the lift cylinder operation or raise function, the lift valve 166 is shifted to extend the lift cylinders 210, 212, thereby raising the mower. Such operation trips the sequence valve 186 and opens check valves 194, 198. During the lift function, the tilt cylinder 208 retracts and the tongue lockout cylinder 222 extends. As noted above, neither of these components or functions is required for operation of the lateral transport system. However, actuation of the cylinders 208, 222 would occur if the system is equipped with such cylinders 208, 222.

Figure 24:
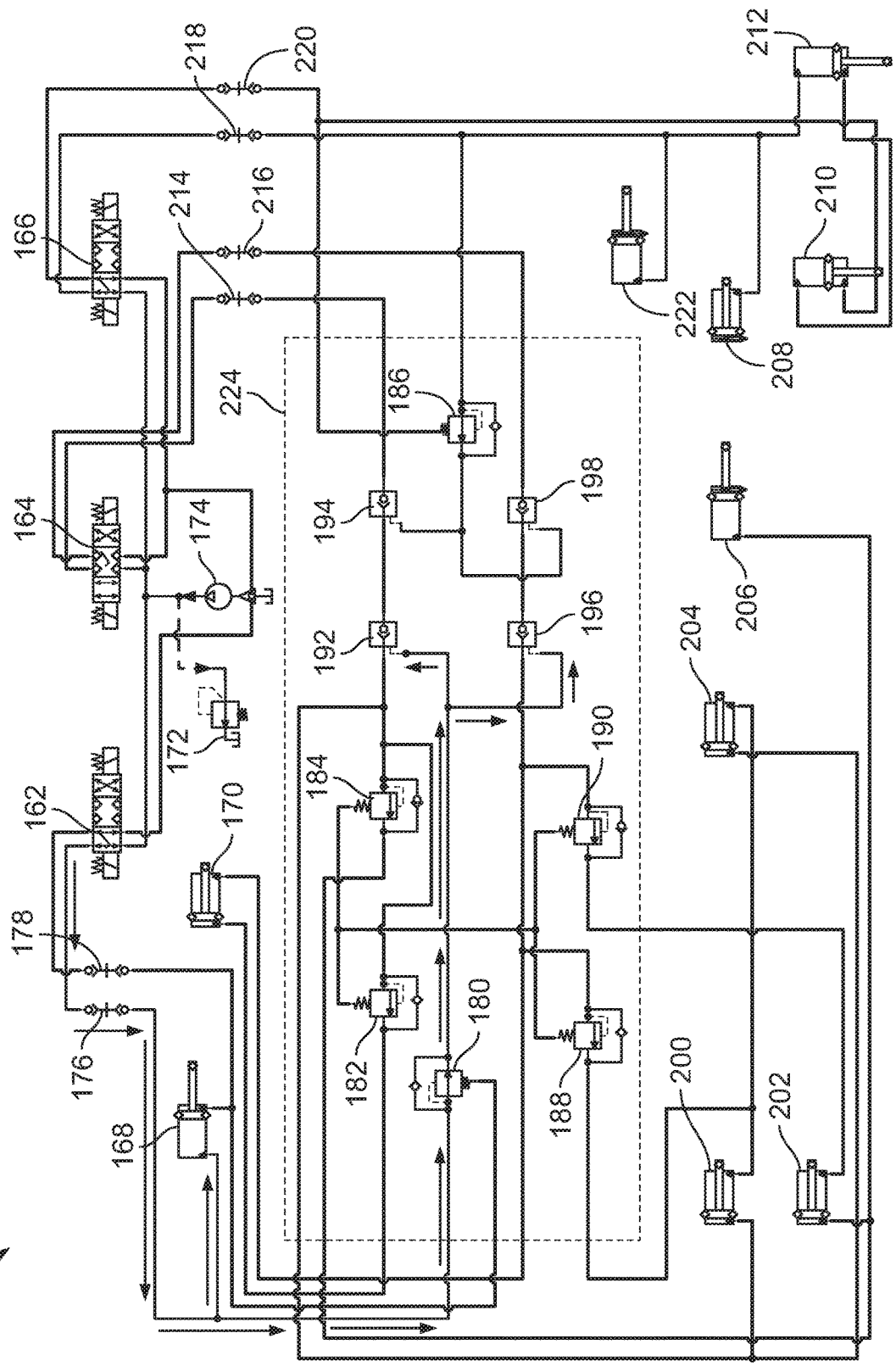
FIG. 24 is the hydraulic circuit of FIG. 22 in a swing operation mode.

In FIG. 24, during the swing cylinder operation, the swing valve 162 is shifted to extend the swing cylinder 168, thereby swinging the mower to a full swing right or left position. In the illustrations of the lateral transport system provided herein, the swinging would occur to the left. Such operation trips the sequence valve 180 and opens the check valves 192, 196.

Figure 25:
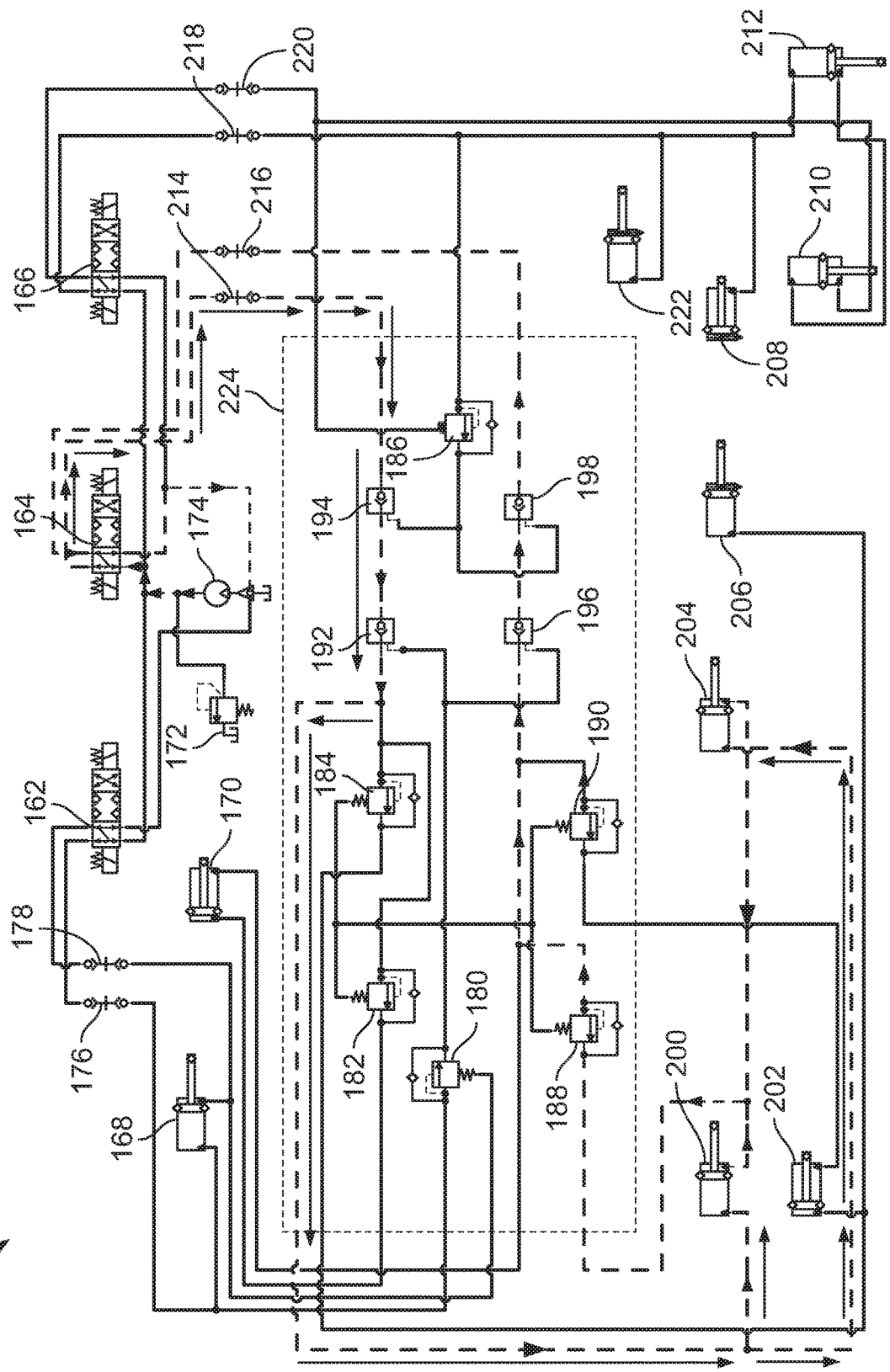
FIG. 25 is the hydraulic circuit of FIG. 22 in step one of a transport deployment operation mode.

In FIG. 25, during step one of the transport deployment operation to road mode, the lift cylinders 210, 212 are fully extended and the lift valve 166 is locked in the lift position, forcing the check valves 194, 198 to remain open. The swing cylinder 168 is fully extended and the swing valve 162 is locked in the extend position forcing the check valves 192, 196 to remain open. The transport valve 164 is shifted to provide flow through the check valves 192, 194 to extend the bi-fold cylinder 200 and the WRS cylinder 204 (if equipped).

Figure 26:
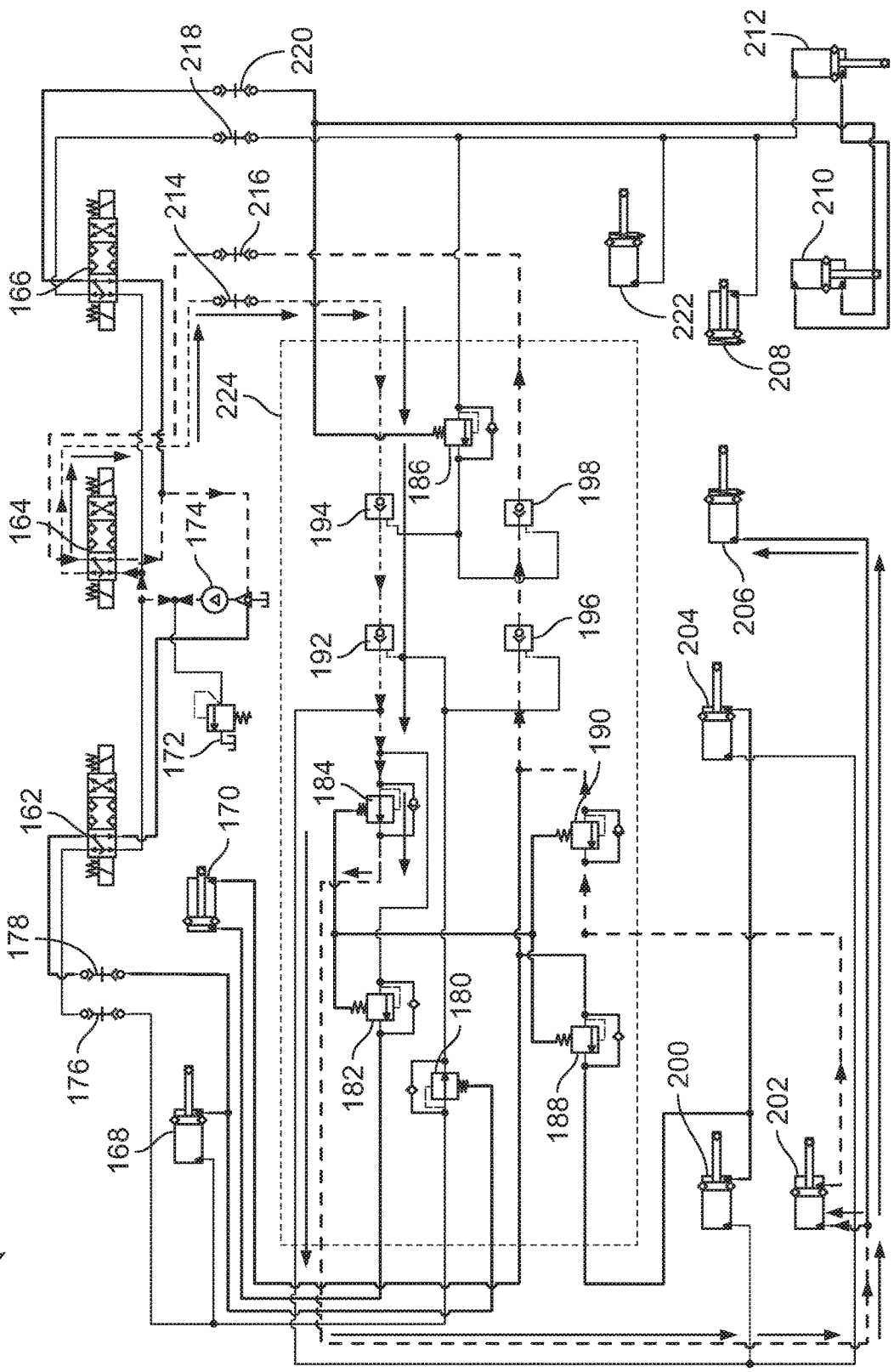
FIG. 26 is the hydraulic circuit of FIG. 22 in step two of a transport deployment operation mode.

In FIG. 26, during step two of the transport deployment operation to road mode, the lift, swing and transport valves 166, 162, 164 remain shifted and locked for the transport function to continue. The bi-fold cylinder 200 is extended completely and sequence valve 184 is tripped to allow flow to the transport cylinder 202. The flail curtain cylinder 206 (if equipped) is actuated to raise the flail curtain.

Figure 27:
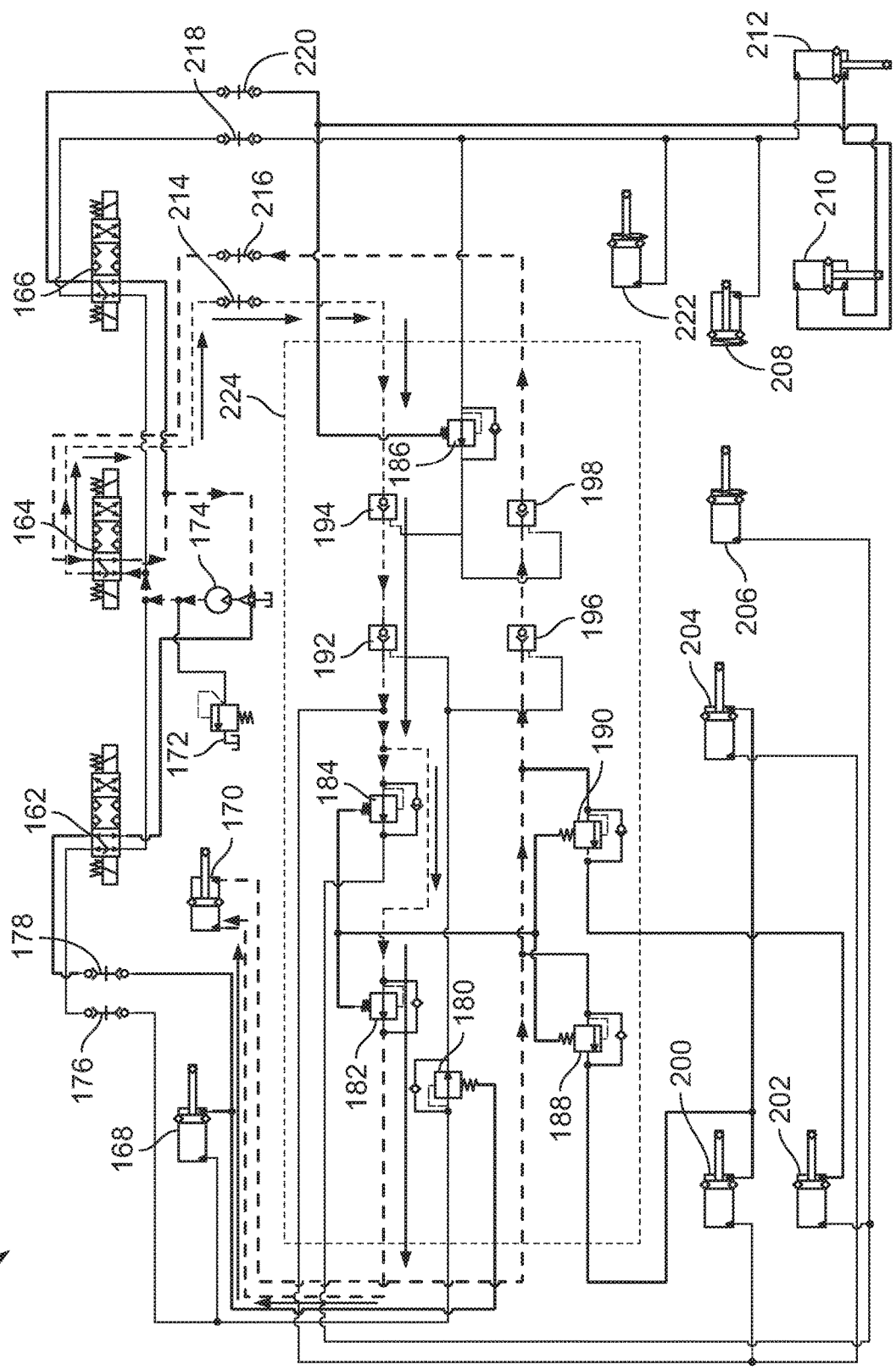
FIG. 27 is the hydraulic circuit of FIG. 22 in step three of a transport deployment operation mode.

In FIG. 27, during step three of the transport deployment operation to road mode, the lift, swing and transport valves 166, 162, 164 remain shifted and locked for the transport function to continue. The transport cylinder 202 is extended completely and sequence valve 182 is tripped to allow flow to the second swing cylinder 170.

Figure 28:
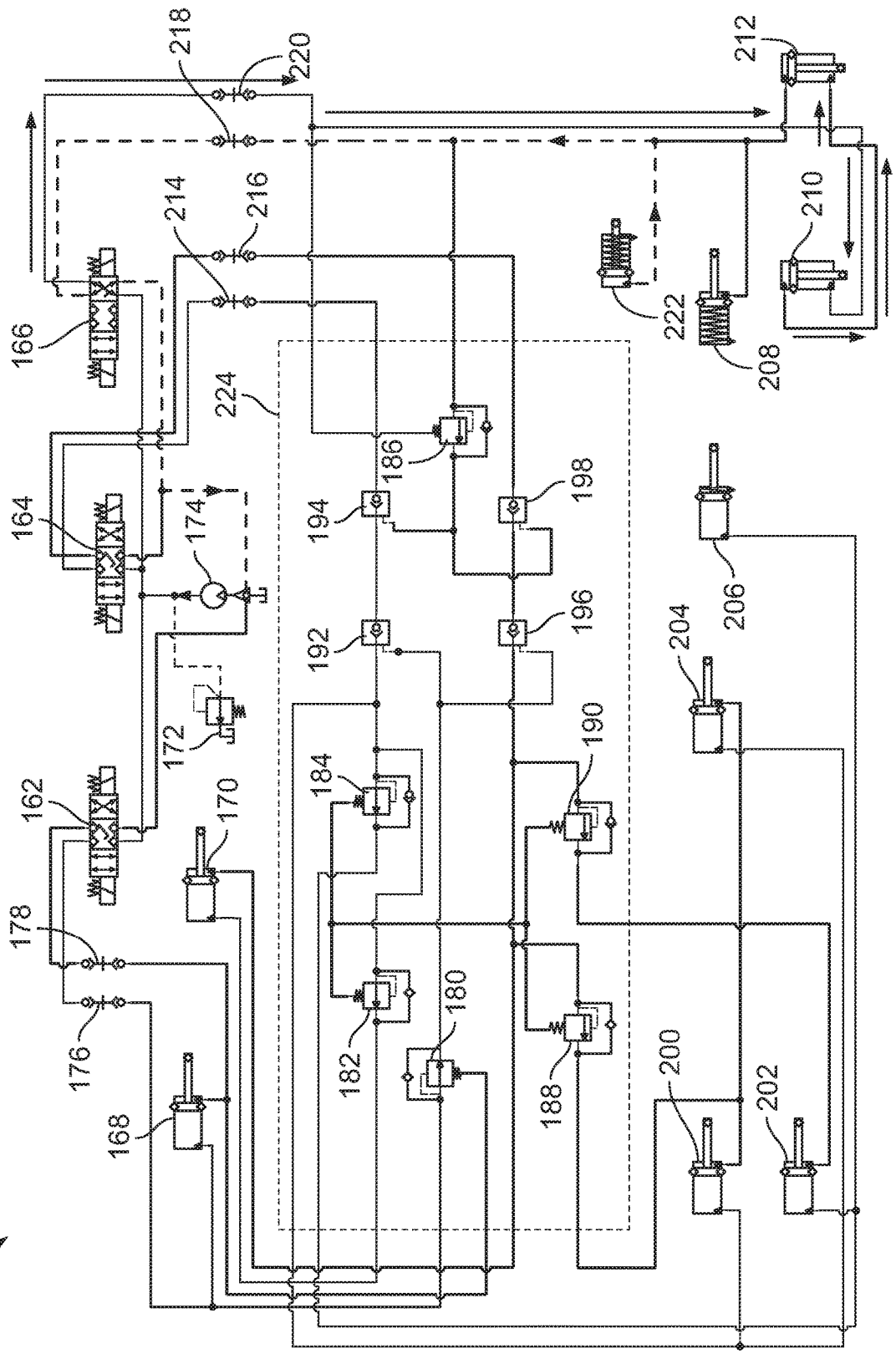
FIG. 28 is the hydraulic circuit of FIG. 22 in step four of a transport deployment operation mode.
Figure 29:
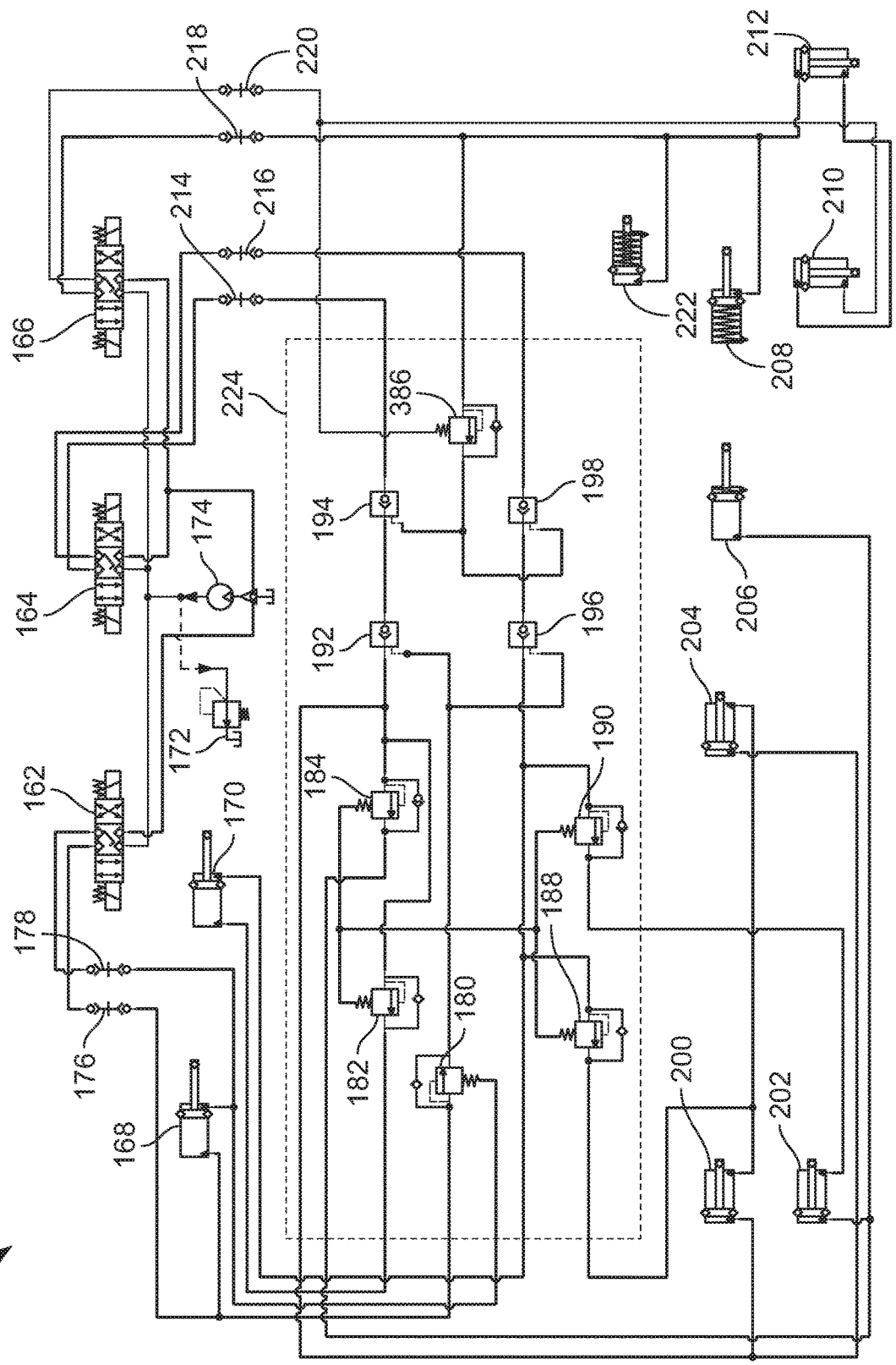
FIG. 29 is the hydraulic circuit of FIG. 22 in a steady-state/road operation mode.

In FIG. 28, during step four of the transport deployment operation to road mode, the second swing function is complete, and the transport and swing valves 164, 162 are shifted to blocked positions. The lift valve 166 is shifted to a lower position. Such operation lifts the field wheels up to increase ground clearance while also engaging the tongue transport lockout cylinder 222 (if equipped).

FIG. 29 shows the hydraulic circuit 230 in a steady-state/road operation mode. In such operation, retraction of the lift cylinders 210, 212 closes the check valves 194, 198, disabling the transport function during the transport operation. The check valves render the transport hydraulic system non-functional at any time when the lift and swing cylinders 210, 212, 168, 170 are not fully extended and the lift and swing valves 166, 162 are not locked in the extended position. The lockout system acts as a safety feature to keep the transport system from activating during mowing or road transport operation.

Figure 30:
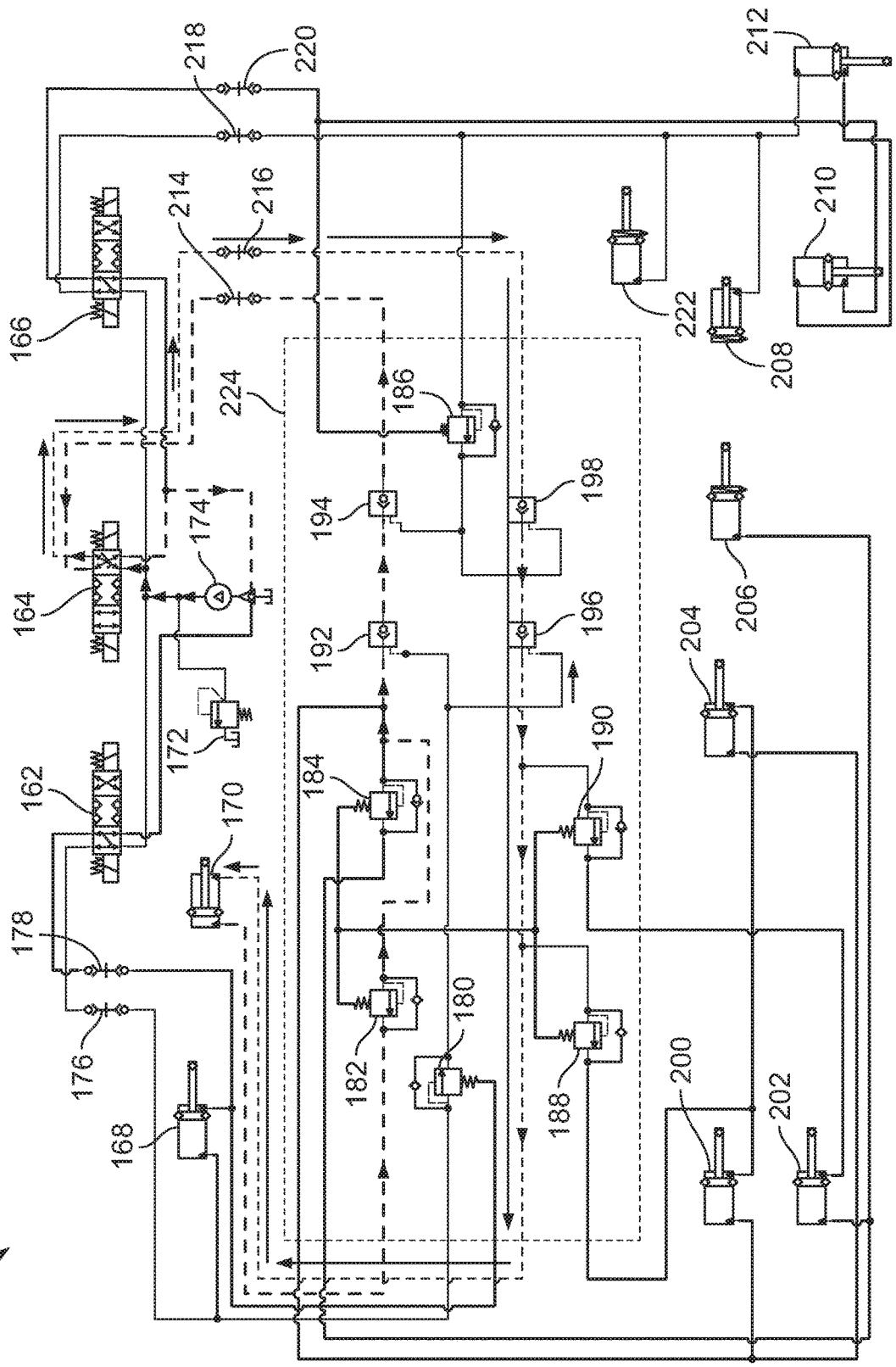
FIG. 30 is the hydraulic circuit of FIG. 22 in step one of a stowage operation mode.

In FIG. 30, during step one of the transport to stowage operation mode, the lift valve 166 is shifted to extend the lift cylinders 210, 212, tripping the sequence valve 186 and opening check valves 194, 198. The swing valve 162 is shifted to pressurize the swing cylinder 168, tripping the sequence valve 180 and opening check valves 192, 196. The transport valve 164 is shifted to provide flow through check valves 196, 198 to retract the second swing cylinder 170.

Figure 31:
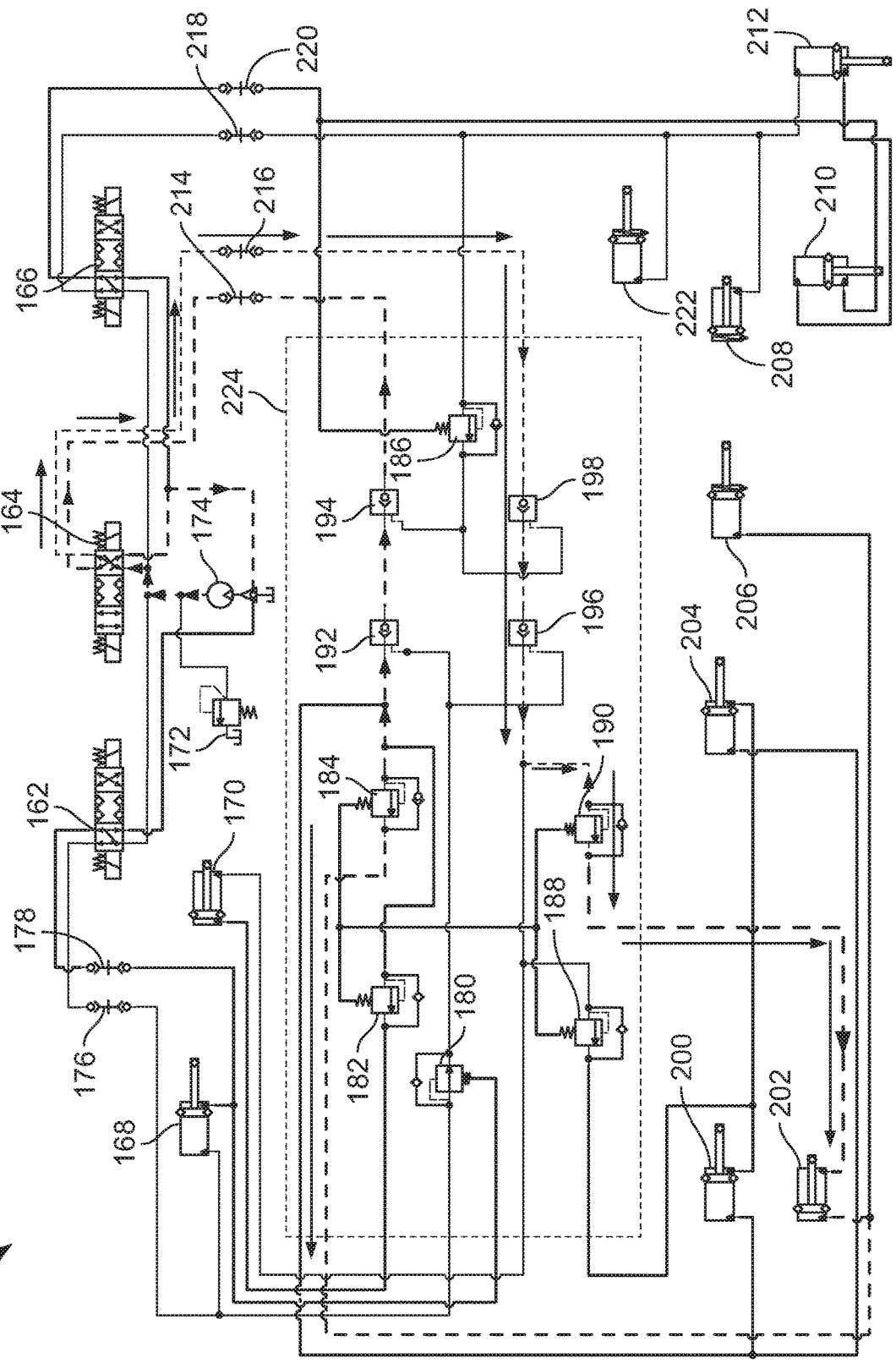
FIG. 31 is the hydraulic circuit of FIG. 22 in step two of a stowage operation mode.

In FIG. 31, during step two of the transport to stowage operation mode, the lift and swing valves 166, 162 remain shifted to keep the check valves 192-198 open. The transport valve 164 remains shifted for the transport function to continue. After the second swing cylinder 170 has been fully retracted, sequence valve 190 is tripped to allow flow to retract the transport cylinder 202.

Figure 32:
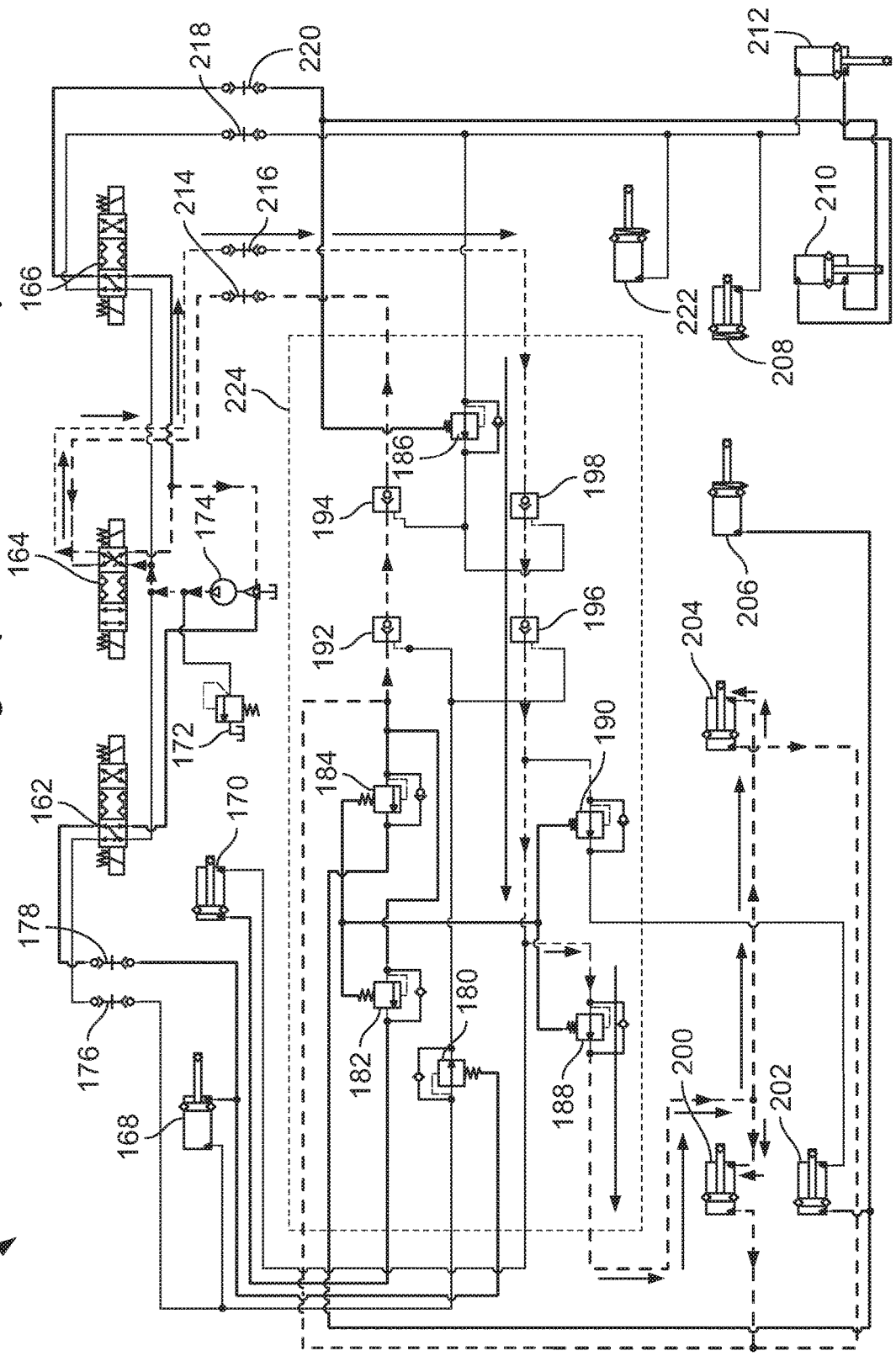
FIG. 32 is the hydraulic circuit of FIG. 22 in step three of a stowage operation mode.

In FIG. 32, during step three of the transport to stowage operation mode, the lift and swing valves 166, 162 remain shifted to keep the check valves 192-198 open. The transport valve 164 remains shifted for the transport function to continue. After the transport cylinder 202 is fully retracted, sequence valve 188 trips to retract the bi-fold cylinder 200. Such operation also retracts the WRS cylinder 204 (if equipped).

Figure 33:
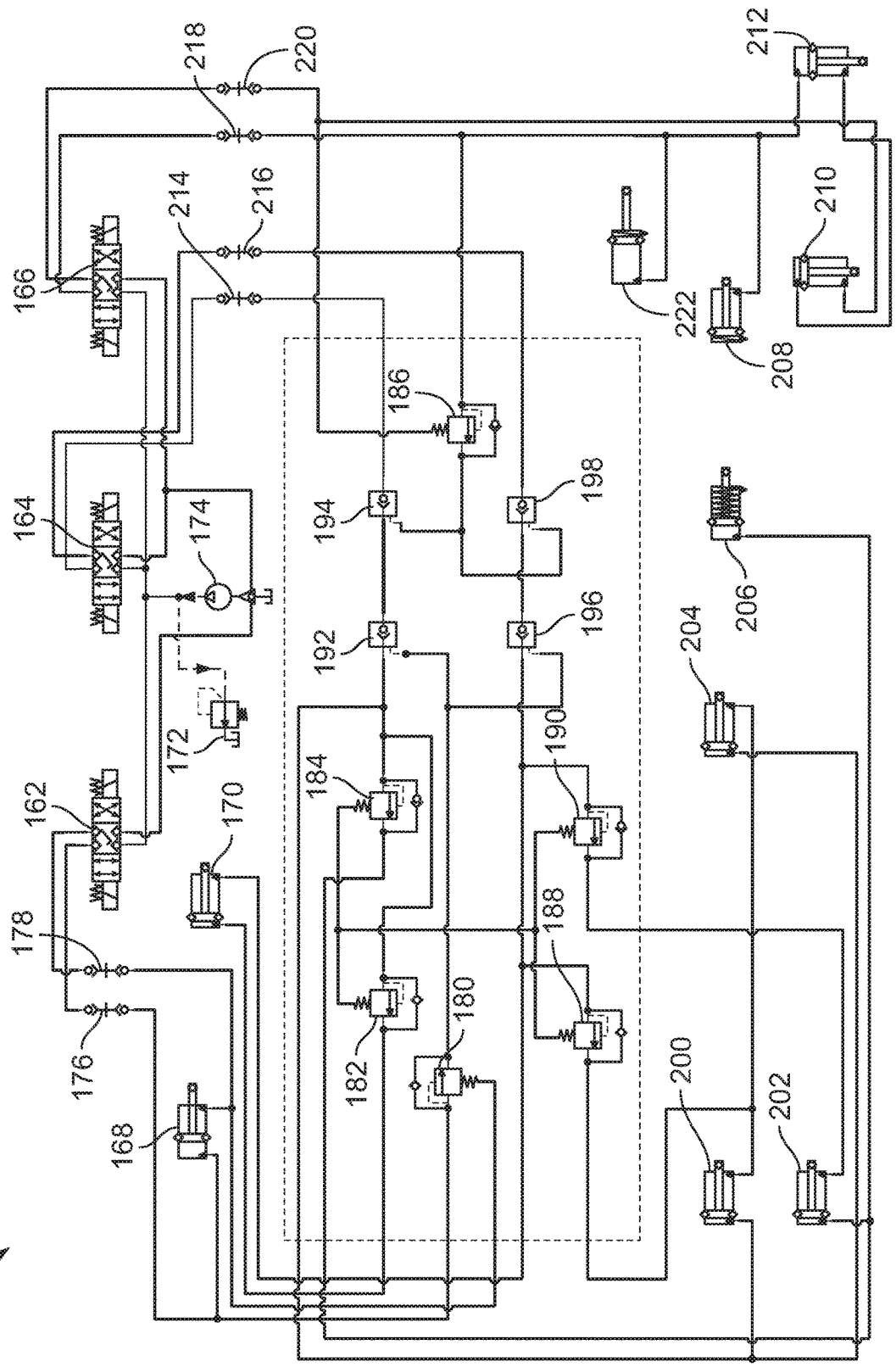
FIG. 33 is the hydraulic circuit of FIG. 22 in step four of a stowage operation mode.

In FIG. 33, during step four of the transport to stowage operation mode, the bi-fold cylinder 200 is completely retracted along with the WRS cylinder 204 (if equipped), and the transport valve 164 shifts to the closed position. The lift and swing valves 166, 162 are shifted to the closed positions, closing the check valves 192-198 and locking out the transport hydraulics from operation. The transport hydraulics do not function while the swing and lift cylinders 168, 170, 210, 212 are not fully extended and the valves 162, 166 are not in the extended positions.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A lateral transport system for a harvester, comprising:
a chassis;
first and second ground wheels rotatably coupled to the chassis; and
a lateral transport assembly operably coupled to the chassis and operable between a transport operation mode and a stowed operation mode, the lateral transport assembly comprising:
a tongue pivotally coupled to the chassis;
a first suspension element rotatable about a first axis and a second axis;
a second suspension element rotatable about the second axis; and
a hydraulic actuation system operably coupled to the tongue, the first suspension element, and the second suspension element; and
wherein in the transport operation mode, hydraulic fluid is allowed to flow into the hydraulic actuation system to rotate the first suspension element about the first axis, and subsequently rotate the first and second suspension elements about the second axis, wherein the hydraulic actuation system comprises a first tongue hydraulic cylinder and a second tongue hydraulic cylinder.

2. The lateral transport system of claim 1, wherein the first axis is perpendicular to the second axis.

3. The draper header of claim 1, wherein the hydraulic actuation system comprises a tongue hydraulic cylinder coupled between the tongue and the chassis.

4. The draper header of claim 3, wherein in a transport operation mode, the tongue hydraulic cylinder is actuated to rotate the tongue from a first position to a second position substantially lateral relative to the chassis.

5. The draper header of claim 1, wherein the first tongue hydraulic cylinder is pivotally coupled between a first flange of the tongue and a first flange of the chassis.

6. The draper header of claim 5, wherein the second tongue hydraulic cylinder is pivotally coupled between the first flange of the tongue and a second flange of the tongue.

7. The draper header of claim 1, wherein in the transport operation mode, the first tongue hydraulic cylinder is actuated to extend to partially rotate the tongue relative to the chassis prior to rotation of the first suspension element about the first axis.

8. The draper header of claim 7, wherein after rotation of the first suspension element about the first axis, the second tongue hydraulic cylinder is actuated to extend to rotate the tongue relative to the chassis to a laterally extending position.

9. The draper header of claim 1, wherein the hydraulic actuation system comprises a functional lockout of the lateral transport system after rotation of the first and second suspension elements about the second axis.

10. The draper header of claim 1, wherein in the stowed operation mode, the hydraulic fluid is allowed to flow into the hydraulic actuation system to rotate the first and second suspension elements about the second axis, and subsequently rotate the first suspension element about the first axis to position the first suspension element over the second suspension element.

11. A harvester, comprising:
a frame;
first and second lift cylinders operably coupled to the frame and configured to selectively lift and lower a lateral transport system relative to the frame; and
the lateral transport system, comprising:
a chassis;
first and second ground wheels rotatably coupled to the chassis; and
a lateral transport assembly operably coupled to the chassis and operable between a transport operation mode and a stowed operation mode, the lateral transport assembly comprising:
a tongue pivotally coupled to the chassis;
a first suspension element rotatable about a first axis and a second axis;
a second suspension element rotatable about the second axis; and
a hydraulic actuation system operably coupled to the tongue, the first suspension element, and the second suspension element, wherein the hydraulic actuation system comprises a first tongue hydraulic cylinder and a second tongue hydraulic cylinder, the first tongue hydraulic cylinder pivotally coupled between a first flange of the tongue and a first flange of the chassis, and the second tongue hydraulic cylinder pivotally coupled between the first flange of the tongue and a second flange of the tongue; and,
wherein in the transport operation mode, hydraulic fluid is allowed to flow into the hydraulic actuation system to rotate the first suspension element about the first axis, and subsequently rotate the first and second suspension elements about the second axis.

12. The harvester of claim 11, wherein the first axis is perpendicular to the second axis.

13. The harvester of claim 11, wherein the hydraulic actuation system comprises a tongue hydraulic cylinder coupled between the tongue and the chassis.

14. The harvester of claim 13, wherein in a transport operation mode, the tongue hydraulic cylinder is actuated to rotate the tongue from a first position to a second position substantially lateral relative to the chassis.

15. The harvester of claim 11, wherein in the transport operation mode, the first tongue hydraulic cylinder is actuated to extend to partially rotate the tongue relative to the chassis prior to rotation of the first suspension element about the first axis.

16. The harvester of claim 15, wherein after rotation of the first suspension element about the first axis, the second tongue hydraulic cylinder is actuated to extend to rotate the tongue relative to the chassis to a laterally extending position.

17. The harvester of claim 11, wherein the hydraulic actuation system comprises a functional lockout of the lateral transport system after rotation of the first and second suspension elements about the second axis.

18. The harvester of claim 11, wherein in the stowed operation mode, the hydraulic fluid is allowed to flow into the hydraulic actuation system to rotate the first and second suspension elements about the second axis, and subsequently rotate the first suspension element about the first axis to position the first suspension element over the second suspension element.

* * * * *